(12) United States Patent
Bax et al.

(10) Patent No.: US 9,947,060 B2
(45) Date of Patent: Apr. 17, 2018

(54) INFORMATION MATCHING AND MATCH VALIDATION

(71) Applicant: EXCALIBUR IP, LLC, New York, NY (US)

(72) Inventors: Eric Bax, Sierra Madre, CA (US); Jitesh Mehta, Santa Clara, CA (US); Nicola Barbieri, Catalunya (ES); David Garcia Soriano, Catalunya (ES)

(73) Assignee: EXCALIBUR IP, LLC, New York, NY (US)

( * ) Notice: Subject to any disclaimer, the term of this patent is extended or adjusted under 35 U.S.C. 154(b) by 356 days.

(21) Appl. No.: 14/294,362

(22) Filed: Jun. 3, 2014

(65) Prior Publication Data

US 2015/0347591 A1  Dec. 3, 2015

(51) Int. Cl.
| | | |
|---|---|---|
| G06Q 99/00 | (2006.01) | |
| G06Q 50/00 | (2012.01) | |
| G06Q 30/02 | (2012.01) | |
| G06F 17/18 | (2006.01) | |

(52) U.S. Cl.
CPC ............ *G06Q 50/01* (2013.01); *G06F 17/18* (2013.01); *G06Q 30/0269* (2013.01)

(58) Field of Classification Search
CPC .................. G06F 17/18; G06Q 50/01
See application file for complete search history.

(56) References Cited

U.S. PATENT DOCUMENTS

| | | | | |
|---|---|---|---|---|
| 5,923,848 A | * | 7/1999 | Goodhand | G06Q 10/107 709/206 |
| 7,797,345 B1 | * | 9/2010 | Martino | G06F 17/30867 707/792 |
| 8,924,465 B1 | * | 12/2014 | Tunguz-Zawislak | H04N 21/00 709/203 |
| 2007/0044026 A1 | * | 2/2007 | Potter, III | H04M 3/4217 715/741 |
| 2012/0109980 A1 | * | 5/2012 | Strauss | G06Q 30/02 707/751 |
| 2013/0110641 A1 | * | 5/2013 | Ormont | G06Q 50/01 705/14.66 |
| 2015/0095183 A1 | * | 4/2015 | Desmond | G06Q 50/01 705/26.7 |
| 2015/0293997 A1 | * | 10/2015 | Smith | H04L 51/32 707/749 |

OTHER PUBLICATIONS

Wikipedia, Bayes' theorem, https://en.wikipedia.org/w/index.php?title=Bayes%27_theorem&diff=557389454&oldid=557389373, May 29, 2013, 11 pp.*
Korula, et al. "An efficient reconciliation algorithm for social networks"; Proceedings of the VLDB Endowment, vol. 7, No. 5; 2014; 12 pages.

* cited by examiner

*Primary Examiner* — Marc S Somers
(74) *Attorney, Agent, or Firm* — James J. DeCarlo; Greenberg Traurig, LLP

(57) ABSTRACT

Disclosed herein is a matching of multiple different social graphs to generate a combined social graph. Such a combined social graph may be searched and used in determining information to provide to a user, for example. An iterative metric learning approach may be used in matching multiple different social graphs. A mechanism is provided to validate a match from different social graphs. Match validation of data field matching is provided.

33 Claims, 11 Drawing Sheets

INFORMATION MATCHING AND MATCH VALIDATION

FIELD OF THE DISCLOSURE

The present invention relates to information matching and validation of such matching; such matching including without limitation matching users, or entities, across multiple social graphs from different social networks, matching different information about a user, etc.

BACKGROUND

There are a number of social networks, each of which may have its own social graph representing the social network. A social graph may comprise multiple nodes, each node representing an entity, e.g., a user, and multiple edges, each edge connecting a pair of nodes and representing a relationship between the pair of nodes, or entities. There is no requirement for a user's information available on one social network to coincide with information known about the same user on another social network.

Additionally, information about a user available from multiple, different information sources may not be associated making it difficult, if not impossible, to relate one item of information about the user with another item of information about the user.

SUMMARY

Each of multiple social graphs is limited in its information to the particular social network that it represents. It would be beneficial to be able to combine multiple social graphs, so that information about entities across the multiple graphs may be represented in a combined social graph. By combining the multiple graphs, a more complete view of social connections, or social ties, is obtained.

In addition, it would be beneficial to be able to associate fields, or items, of information about a user In accordance with one or more embodiments, users, or entities, found in at least two social graphs are matched using data about the users in a first phase. In accordance with one or more embodiments, a metric learning approach may be used to generate a combined scoring function, which may be used to generate a score reflecting the degree to which information associated with each user of a pair of users match. The metric learning may be performed prior to performing the user data matching performed in the first phase, and the metric learning may be updated to reflect the data augmentation from a second phase. In the second phase, connections found in the at least two social graphs are used to augment data associated with users in the at least two social graphs. The data augmentation may be used to update the combined scoring function and/or may be used match users.

In accordance with one or more embodiments, the criteria used to match users between the at least two social graphs in the first phase may be a stricter criteria than the criteria used in the iterations performed in the second phase. In the second phase's iterations, the fact that users are connected to the same matched user or users in the at least two social graphs being matched indicates a higher probability that the users in different graphs represent the same person. Accordingly, less strict matching criteria can be used in the iterations performed in the second phase, which may result in more matches.

In accordance with one or more embodiments, a resulting, combined social graph may have one node per entity, user or person, and an edge between any pair of users that are connected in one or more of the social graphs that are combined. Embodiments of the present disclosure provide a mechanism for identifying the nodes occurring in different social graphs that represent a certain user.

In accordance with one or more embodiments, a method is provided, the method comprising analyzing, by at least one computing device, a plurality of different social graphs to generate a combined social graph from the plurality of different social graphs, each social graph of the plurality corresponding to a social network and each social graph and the combined social graph comprising a plurality of nodes and a plurality of edges each connecting a pair of nodes of the plurality of nodes; searching, by the at least one computing device, the combined social network to determine if first and second users have a social connection in the combined social network; and providing, by the at least one computing device, information associated with the second user to the first user if the first and second users have a social connection in the combined social network.

In accordance with one or more embodiments a system is provided, which system comprises at least one computing device comprising one or more processors to execute and memory to store instructions to analyze a plurality of different social graphs to generate a combined social graph from the plurality of different social graphs, each social graph of the plurality corresponding to a social network and each social graph and the combined social graph comprising a plurality of nodes and a plurality of edges each connecting a pair of nodes of the plurality of nodes; search the combined social network to determine if first and second users have a social connection in the combined social network; and provide information associated with the second user to the first user if the first and second users have a social connection in the combined social network.

In accordance with yet another aspect of the disclosure, a computer readable non-transitory storage medium is provided, the medium for tangibly storing thereon computer readable instructions that when executed cause at least one processor to analyze a plurality of different social graphs to generate a combined social graph from the plurality of different social graphs, each social graph of the plurality corresponding to a social network and each social graph and the combined social graph comprising a plurality of nodes and a plurality of edges each connecting a pair of nodes of the plurality of nodes; search the combined social network to determine if first and second users have a social connection in the combined social network; and provide information associated with the second user to the first user if the first and second users have a social connection in the combined social network.

In accordance with one or more embodiments, a method is provided, the method comprising receiving, by the at least one computing device, a first data field for an entity; searching, by the at least one computing device, a plurality of data fields to identify a second data field corresponding to the first data field's entity, the first and second data fields' correspondence to a same entity being determining using a confidence level in an aggregation of the first and second data fields for the entity; and providing, by the at least one computing device, the second data field in response to receiving the first data field based on the confidence level in the aggregation of the first and second data fields for the entity.

In accordance with one or more embodiments a system is provided, which system comprises at least one computing device comprising one or more processors to execute and memory to store instructions to receive a first data field for an entity; search a plurality of data fields to identify a second data field corresponding to the first data field's entity, the first and second data fields' correspondence to a same entity being determining using a confidence level in an aggregation of the first and second data fields for the entity; and provide the second data field in response to receiving the first data field based on the confidence level in the aggregation of the first and second data fields for the entity.

In accordance with yet another aspect of the disclosure, a computer readable non-transitory storage medium is provided, the medium for tangibly storing thereon computer readable instructions that when executed cause at least one processor to receive a first data field for an entity; search a plurality of data fields to identify a second data field corresponding to the first data field's entity, the first and second data fields' correspondence to a same entity being determining using a confidence level in an aggregation of the first and second data fields for the entity; and provide the second data field in response to receiving the first data field based on the confidence level in the aggregation of the first and second data fields for the entity.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides a general overview of system components that may be used in connection with one or more embodiments of the present disclosure.

FIG. 2 provides an overview of a social graph aggregation process for use in accordance with one or more embodiments of the present disclosure.

FIG. 3 provides examples of neighborhoods for use in accordance with one or more embodiments of the present disclosure.

FIG. 4, which comprises FIGS. 4A and 4B, provides an example process flow which may be used in connection with one or more embodiments of the present disclosure.

FIG. 5 provides a confidence level process flow in accordance with one or more embodiments of the present disclosure.

FIG. 6 provides a match score frequency determination process flow in accordance with one or more embodiments of the present disclosure.

FIG. 7 provides an example of a set of nodes in a data field network in accordance with one or more embodiments of the present disclosure.

FIG. 8 provides an example of a general overview of system components that may be used in connection with one or more embodiments of the present disclosure.

DETAILED DESCRIPTION

Figure 1:
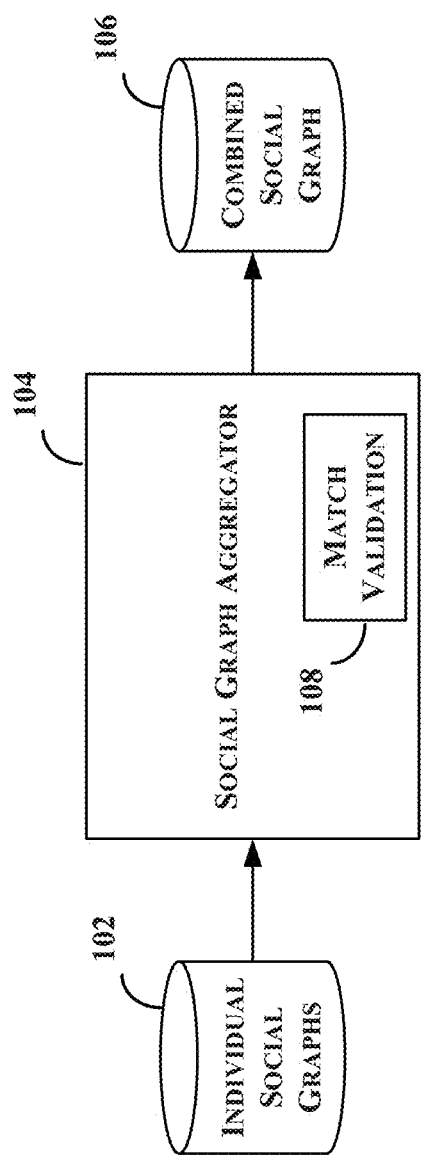

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In accordance with one or more embodiments of the present disclosure, a system, method and architecture are provided to collect and aggregate information from multiple different social graphs, each of which may represent a different social network, to create a combined, or aggregate, social graph, which represents a combination of information found in the multiple different social graphs. Embodiments of the present disclosure consolidate a given user's nodes found in two or more different social graphs into a single node, and represents each of the user's relationships, or ties, from the graphs in the resulting social graph. In the combined social graph, a node may be an aggregate node, e.g., a node that is a combination of nodes for a given user found in at least two social graphs, and each edge represents a relationship, e.g., a social tie, between a pair of nodes, which edge may be found in one or more of the social graphs aggregated to yield the combined social graph.

FIG. 1 provides a general overview of system components that may be used in connection with one or more embodiments of the present disclosure. Element 102 of FIG. 1 represents a number, at least two, of social graphs, each of which may be associated with a different social network, or social networking site. By way of some non-limiting examples, social graphs 102 may represent social networks of such social networking site as FACEBOOK, TWITTER, FLICKR, LINKEDIN, PINTEREST, ANOBII, INSTAGRAM, MYSPACE, TUMBLER, etc. The list of examples of social networking sites is not intended to be exhaustive; it should be apparent that any source of a social graphs now known or later developed may be used in accordance with one or more embodiments of the present disclosure.

Each social graph contains one or more nodes, each of which represents a user, and one or more edges, each of which connects a pair of nodes/users. In addition, each node may have associated user data, which may include such user data as email address(es), name(s), location(s), screen name(s), birth year and/or date, among other things.

Element 104 represents one or more computing devices, which may form a system, to aggregate, or combine, the different individual social graphs 102 to form a combined social graph 106. In aggregating the social graph 102, users in one social graph 102 are matched with users in one or more other social graph(s) 102, where each matched user is determined to be the same user. Herein, a user may refer to one individual, or person, company, a group of people, etc.

In accordance with one or more embodiments, element 104 may comprise a match validator 108, which may be used to validate a match identified by social graph aggregator, e.g., a match indicating that a pair of nodes from different social graphs represent the same entity, or user. Match validator 108 is discussed in more detail below.

Combined social graph 106 might be used in any number of applications. By way of a non-limiting example, combined social graph 106 might be used in a people search, which generates a set of results including one or more individuals. The results might include information about an individual in the search results, where the information is obtained from one or more of the social graph(s) 102 used to generate the combined social graph 106. By way of a further non-limiting example, the combined social graph 106 may be used to determine whether or not the searching user, e.g., a user for whom the search results are generated, is connected with, e.g., is socially connected to, another individual included in the search results. Such information might be used to identify what, if any, information, e.g., user profile, user data, etc., to provide to the searching user about the individual included in the search results. In the non-limiting example, if the searching user is not connected in any way to the individual included in the search results, the searching user may be provided with limited, if any, information about the individual. Conversely and if the searching user is connected to the individual, the searching user may be provided with some or all of the information associated with the individual included in the search results. Such associated information may comprise user profile data including and without limitation pictures, email address(es), nickname(s), physical address(es), calendar(s), address book entry(ies), etc.

Another example of an application of the combined social graph 106 is in personalization, e.g., advertising and/or content personalization. By way of a non-limiting example, in a case that it is known that a first user, or first users, has/have a connection, or social tie, to a second user, or second users, and that the second user(s) play or like soccer, this knowledge may be used to infer that the first user(s) may also play or like soccer. In such a case, one or more advertisements related to soccer may be selected for the first user(s), and/or soccer-related content may be selected for, or recommended to, the first user(s).

The combined social graph 106 may be used to facilitate use of an application such as an electronic mail client. By way of a non-limiting example, a first user might type a second user's name into the "to" field, and one or more email addresses for the second user may be provided for the first user's selection and inclusion in the "to" field, where the one or more email addresses might be from a social network other than one that the first user is currently using, or a social network that the first user in not a member, etc. To further illustrate and without limitation, the second user's name might be used to search the combined social graph 106 to locate the second user and any email address associated with the second user identified in the combined social graph 106, which email address(es) may be collected from any one or more of the individual social graphs 102 by social graph aggregator 104. In so doing, the first user need not know, and need not attempt to determine, which social network has the second user's, or intended recipient's, email address(es).

The above examples of applications, and/or usages, of the combined social graph 106 are not intended to be exhaustive. It should be apparent that the combined social graph 106 may be used in connection with other applications/uses.

Figure 2:
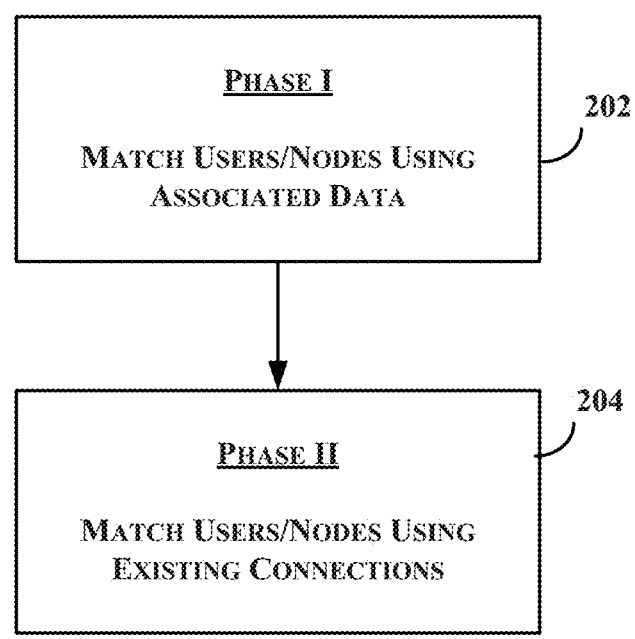

FIG. 2 provides an overview of a social graph aggregation process for use in accordance with one or more embodiments of the present disclosure. The social graph aggregation process shown in FIG. 2 may be implemented by the social graph aggregator 104 to generate the combined social graph 106 using the individual social graphs 102, for example.

In the example shown in FIG. 2, multiple social graphs may be aggregated using a two phase matching approach. In a first phase 202, users/nodes are matched across multiple social graphs, e.g., multiple social graphs from multiple, different social networks, using data associated with the user/nodes from the multiple graphs. In accordance with one or more embodiments, two or more nodes found in different social graphs 102 may be matched by searching for nodes having matching information, e.g., where the information may comprise items of information and each item may be stored as a field of a record or other data structure.

A match may be determined using a similarity metric or metrics based on weighted scores for matching between corresponding fields. In accordance with one or more embodiments, a composite scoring function may be used to generate a composite score for the similarity metric(s).

By way of a non-limiting example, names associated with nodes found in at least two social graphs may be matched using an exact character match. Other techniques for matching may include, and are not limited to, phonetic matching using a phonetic conversion algorithm such as soundex, edit distances, n-grams, etc. Phone numbers may be matched by removing punctuation and normalizing for country code, etc. It should be apparent that any method now known or later developed may be used for normalization any of the user data.

By way of some further non-limiting examples, matching may be implemented using hash tables, by hashing one or more fields into separate hash tables for each graph, removing any collisions for each graph, then joining the hash tables to determine pairs of users in graph A and graph B with matching sets of fields. Fields may be normalized before hashing.

To reduce hash collisions and/or distribute the computation, neighbors may be partitioned based on their hash codes, and matching may be done separately for each partition of neighbors. By way of a non-limiting example, user data from two graphs A and B and any neighbors with ID hash codes that end in 0 may be sent to one computer for matching, and the same user data with any neighbors with ID hash codes that end in 1 may be sent to another computer for matching. The matches may then be combined.

By way of a further non-limiting example, matching may be implemented using a search engine, with each unmatched user in one graph represented by a document that contains user data fields and neighbor IDs. These documents may be inserted into the search engine system. Unmatched users in the other graph may be used as queries, and any matches or near-matches are returned as search results. Matches may be separated from near-matches. A term frequency-inverse document frequency (TFIDF) method, or methods, may be used, to give matches among rare field values more weighting. For example, matching a common name will carry less weight than matching a rare name.

By way of a non-limiting example, a user's neighborhood in a given graph may be found by identifying those users that are connected to the user by paths of h or fewer hops, each hop being represented by an edge of the social graph, each edge representing a connection, social tie, relationship, etc. The value of h may be a parameter and may have any value including a default value. As yet another non-limiting example, a user's neighborhood in a given social graph may be determined by identifying those users connected by a path of one hop, then two hops, etc. until the neighborhood includes k or more neighbors, where k may be a parameter, which may have any value including a default value.

It should be apparent that any method now known or later developed may be used for matching information, e.g., one or more fields of information, associated with user node pairs represented in the social graphs being combined.

In a second phase 204, users/nodes not matched in the first phase may be process and information associated with unmatched nodes may be augmented using existing, or known, matches found in user/node neighborhoods identified for the unmatched users/nodes. By way of a non-limiting example, an unmatched user may be a user for which a user data comparison was inconclusive as to whether or not the user matched another user. By way of a further non-limiting example an unmatched user may be a user for which a matching algorithm, e.g., a combined scoring function, generated an inconclusive matching score, e.g., a score that is unable to be used as evidence of a match.

Figure 3:
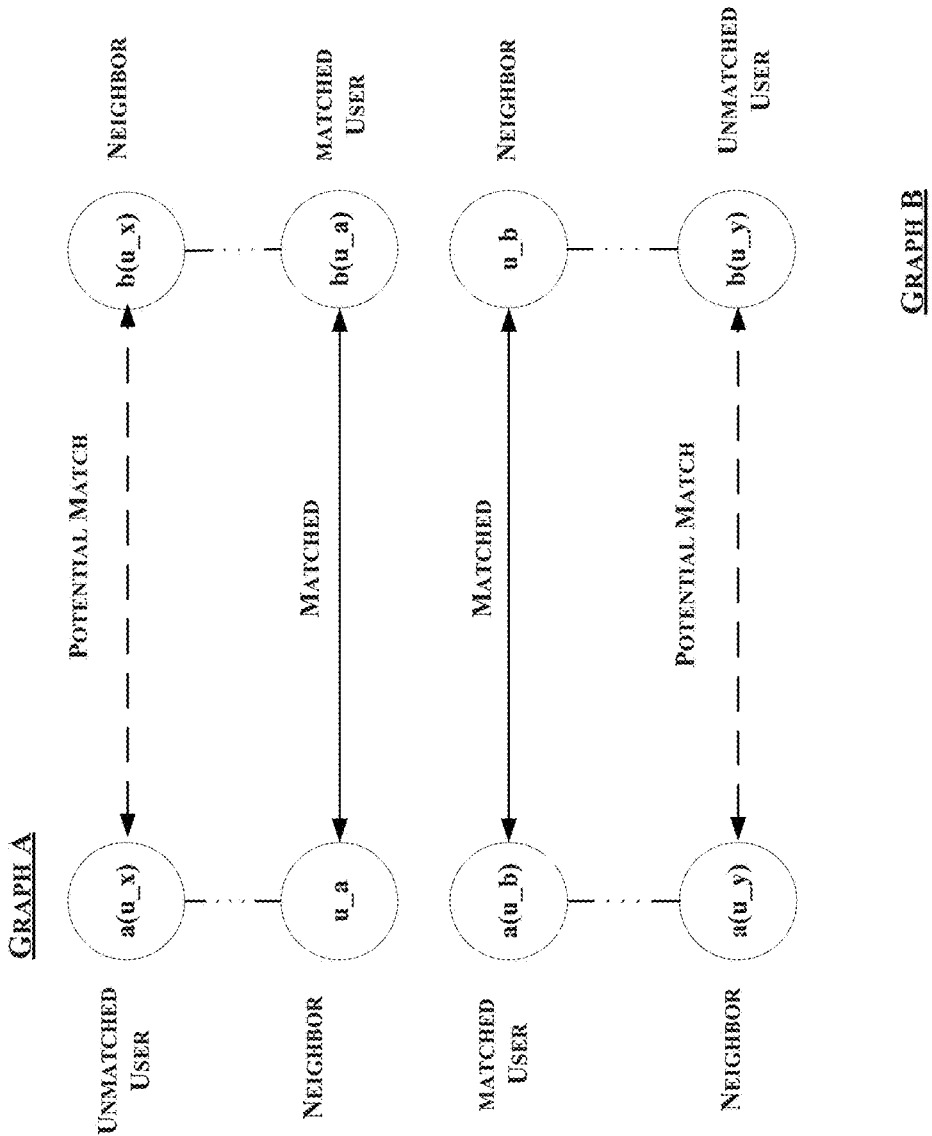

FIG. 3 provides examples of neighborhoods for use in accordance with one or more embodiments of the present disclosure. In the example of FIG. 3, graph A includes nodes representing users a(u_x) and a(u_y) that are currently unmatched users, and nodes representing users u_a and a(u_b) that are neighbors of users a(u_x) and a(u_y), respectively. The example also shows another graph, graph B, which has unmatched users b(u_x) and b(u_y) with respective neighboring users b(u_a) and u_b. User b(u_a) of graph B is matched with user u_a of graph A indicating that u_a and b(u_a) represent the same user/node, and user u_b of graph B is matched with user a(u_b) of graph A indicating that u_b and a(u_b) represent the same user/node.

In the second phase, user b(u_a) is added as data for unmatched user a(u_x) of graph A, user u_a is added as data for unmatched user b(u_x) of graph B, user a(u_b) is added as data for unmatched user b(u_y) of graph B, and user u_b is added as data for user a(u_y) of graph A. The added, or augmented, data added to the data of an unmatched user may comprise information identifying one or more social connections or ties of an unmatched user's neighboring user(s). Such that, a neighboring user's connections across graphs become connections or tines for the unmatched user based on the unmatched user's connection with the neighboring user and the neighboring user's correspondence with a user in other graph(s).

In other words and as one example, since there is a connection between user a(u_x) and user u_a in graph A and user u_a corresponds to, or is a matched with, user b(u_a) in graph B, user data for a(u_x) may be augmented to include a connection between user a(u_x) in graph A and user b(u_a) in graph B; and, similarly, data for user b(u_x) of graph B may augmented to indicate that user b(u_x) of graph B has a connection to user u_a of graph B. As further illustration, data associated with user b(u_y) may be augmented to identify a connection between user b(u_y) in graph B and user a(u_b) of graph A, and the data associated with user a(u_y) may be augmented to identify a connection between users a(u_y) of graph A and user u_b of graph B.

Such augmented information may be referred to as neighborhood data, which may be added to a user/node, e.g., in the second phase 204 shown in FIG. 2.

For purposes of simplicity, information about users a(u_x) and b(u_y) is being augmented based on one neighboring user's correspondence with a matching node in another graph in the example shown in FIG. 3. It should be apparent that such information augmentation may comprise any number of neighbors and correspondences across any number of graphs.

In the example shown in FIG. 3, the augmented data of users a(u_x) and b(u_x) might be used to match user a(u_x) of graph A with user b(u_x) of graph B. By way of a non-limiting example, the information that users a(u_x) and b(u_x) are both connected with the same user, e.g., matched users u_a and b(u_a), may be an indication that there is a correspondence, or match, between user a(u_x) in graph A and user b(u_x) in graph B. The augmented data may be used in conjunction with matching other information, such as is described herein in connection with phase one.

As further illustration and without limitation, graph A might be a social graph of FACEBOOK and graph B might be a social graph of LINKEDIN. In such a case, a FACEBOOK connection between a(u_x) and u_a, the latter of which is determined to match b(u_a) found in a social graph of LINKEDIN, and the LINKEDIN connection between b(u_a) and b(u_x) provides evidence that a(u_x) and b(u_x) may correspond, e.g., are the same user, across the FACEBOOK and LINKEDIN social graphs. Such information might be used together with other user data, e.g., name(s), email address(es), phone number(s), etc. to determine whether or not a(u_x) and b(u_x) are the same user. While the example is described in connection with two social graphs, it should be apparent that more than two social graphs may be used to augment an unmatched user's user data. By way of a non-limiting example, there may be other matches between user u_a and other users in other social graphs that may be used to augment user a(u_x)'s user data, which augmented data may be used to identify a match for user a(u_x).

Similarly, the fact that users a(u_y) and b(u_y) are both connected with matched users a(u_b) and u_b may be used as evidence that there is a correspondence, or match, between user a(u_y) of graph A and user b(u_y) of graph B.

By way of a further non-limiting example, a(u_x) from graph A knows, e.g., has a social tie to or is connected with, a set of users including u_a, and b(u_x) knows a set of users including b(u_a). The two sets may be compared to determine a degree of similarity between the two sets, and the degree or similarity may be used in a determination of whether or not a(u_x) from graph A is the same user as b(u_x) of graph B. Similarly, the set of users associated with each of a(u_y) and b(u_y) may be compared and used in a determination of whether or not a(u_y) of graph A and b(u_y) of graph B are the same user.

A determined degree of similarity between two users' sets of connected users may be used together with other user data or information to determine whether or not the pair of users are the same user. The augmented data may be used together with a score generated using a combined scoring function operating on one or more items of information, or user data, in addition to the augmented data to determine whether or not a pair of users are the same user. Such a determination may take into account a determined confidence in the score generated using a combined scoring function. By way of a non-limiting example, the score generated using the combined scoring function might be used together with the augmented data if there is sufficient confidence in the generated score. By way of a further non-limiting example, an insufficient confidence in the generated score may be used as evidence that the pair of users are not the same user. As yet another non-limiting example, the level of confidence in the combined scoring function's score may depend on the degree of similarity between the known users that the pair of users have in common. If there is a strong similarity between the set of users that user a(u_x) knows and the set of users that user b(u_x) knows, e.g., the two users know a number of the same users, a lower threshold might be used for the level of confidence in the score generated by the combined scoring function. To further illustrate without limitation, a combined scoring function's score generated in phase 1 that did not yield a match because the score did not satisfy a threshold level of confidence may be sufficient given a degree of similarity between the two sets of users determined for user a(u_x) and b(u_x) using neighborhood data.

Referring again to FIG. 2, phases 202 and 204 may be repeated in any number of iterations. By way of some non-limiting examples, a determination to forego another iteration may be made in a case that no new matches are found in a current iteration and/or where a sufficient number of matches are made from the iteration(s) conducted so far.

As is discussed herein, a combined scoring function may be used to generate a score indicating a degree to which user data associated with a pair of users match. One or more embodiments of the present disclosure may use an iterative metric learning approach, which may be a repetitive, or iterative, process comprising a step of learning a combined scoring function using a set of known matches and may also include using a set of known non-matches. In another step of the repetitive, or iterative, process, the combined scoring function may be used to identify matches, e.g., use the combined scoring function determined in the previous step to estimate whether a pair of users, e.g., a user/node in graph A and a user/node in graph B, constitutes a match. In a case that the score generated by the combined scoring function is sufficient, e.g., satisfies a threshold value, the pair of users may be identified to be the same user, and may be added to a set of known matches, which set may be used in the learning step to generate or update the combined scoring function.

In general and in accordance with one or more embodiments, a pair of users may be identified using user data augmented based on neighborhood data, and such augmented user data may be used to determine whether or not a pair of users are the same user, e.g., same person or entity. If the pair of users are determined to be the same user, the match may be added to the set of known matches and used to update the combined scoring function.

In accordance with one or more embodiments, a combined scoring function may be determined using a metric learning approach. Metric learning refers to a process of learning a mechanism, e.g., a function, using training data. Such a function may be a combined scoring function that may be used to identify a similarity between a pair of items, e.g., a pair of users/nodes and/or to determine whether a pair of users match, e.g., are the same person, entity, etc. While a metric learning approach to learning a combined scoring function is described herein in connection with one or more embodiments of the present disclosure, it should be apparent that any approach now known or later developed may be used to determine a function for determining one or more scores, a combination of one or more scores, etc., which may be used in determining whether a pair of users match.

In accordance with one or more embodiments, a combined scoring function, which may be determined using metric learning or any other approach now known or later developed, may be used to generate one or more scores proposed pairings of users/nodes between graph A and graph B. A combined scoring function may be considered to be effective if it yields higher scores to proposed matches (a from A, b from B) that really refer to the same person in graphs A and B than to proposed matches that do not refer to the same person, i.e. proposed matches that are not actual matches.

By way of a further non-limiting example, let a and b denote users/nodes that might be matched to each other. Let $s\_i(a,b)$ represent a set of one or more scoring functions for the pair of users a and b. For example, $s\_1(a,b)$ might be the number of users/nodes connected to user a which are also connected to user b. As another example, $s\_2(a,b)$ might be the number of length-3 substrings of information about user a also found in information about user b.

Users/nodes a and b may have multiple fields, or items of, user data. By way of some non-limiting examples, items of data, or fields of data, may include name, email address, phone number, etc. A scoring function might generate a score based on similarity between a field in user a's user data and a corresponding field in user b's user data. For example, a scoring function on phone numbers may be zero if the phone number for user a is not the same as the phone number for user b. As another example, a scoring function on names may be the number of length-n substrings in user a's that are also in user b's name, where n is a numeric value such as and without limitation 3.

By way of a non-limiting example, in using a metric learning approach, one or more metrics may be used in identifying matches, or non-matches, between pairs of users/nodes. A set M of known (a,b) matching pairs and a set N of known (a,b) non-matching pairs may be used to identify a set of weights, w_i, where w_1 may be a weight for scoring function s_1, w_2 a weight applicable to scoring function s_2. The sets M and N may be used to identify the set of weights, w_1, applicable to the set of scoring functions, s_1, where the set of weights maximize a result of the combined scoring function determined in connection with the matched pairs minus the combined scoring function determined in connection with the unmatched pairs, which may be represented as:

maximize sum_{(a,b)in M}sum_{i}w_i s_i(a,b)– sum_{(a,b) in W} sum_{i} w_i s_i(a,b), subject to sum_{i} (w_i)^2<=1

In the above example, the combined scoring function is s(a,b)=sum_{i} w*_i s_i(a,b), where w* is the optimal weights determined by solving the above maximization.

It should be apparent that any type of learning how to match users/nodes, including any type of metric learning, may be used in connection with one or more embodiments of the present disclosure. Additionally and by way of some non-limiting examples, other types of metric learning include metric learning to maximize a margin, metric learning using kernels, etc. In each case, a desired result is at least one value, e.g., a score, metric, etc. that may be used to separate matches, M, from non-matches, N.

In accordance with one or more embodiments, a confidence may be determined for a score determined using a combined scoring function. A confidence score associated with a combined scoring function may be a probability that the value generated by the combined scoring function accurately represents reality. In other words, a confidence score may represent a calculated level of confidence that if the combined scoring function indicates a match between a pair of users/nodes, the pair of users/nodes are in actuality the same user/node; and, conversely, that the outcome from, and conversely that the pair of users/nodes are in actuality not the same user/node if the combined scoring function indicates that the pair of users/nodes do not represent the same user/node. In accordance with one or more such embodiments, a Bayesian approach may be used to determine a confidence score. A confidence score and determination thereof are discussed in more detail below.

Figure 4A:
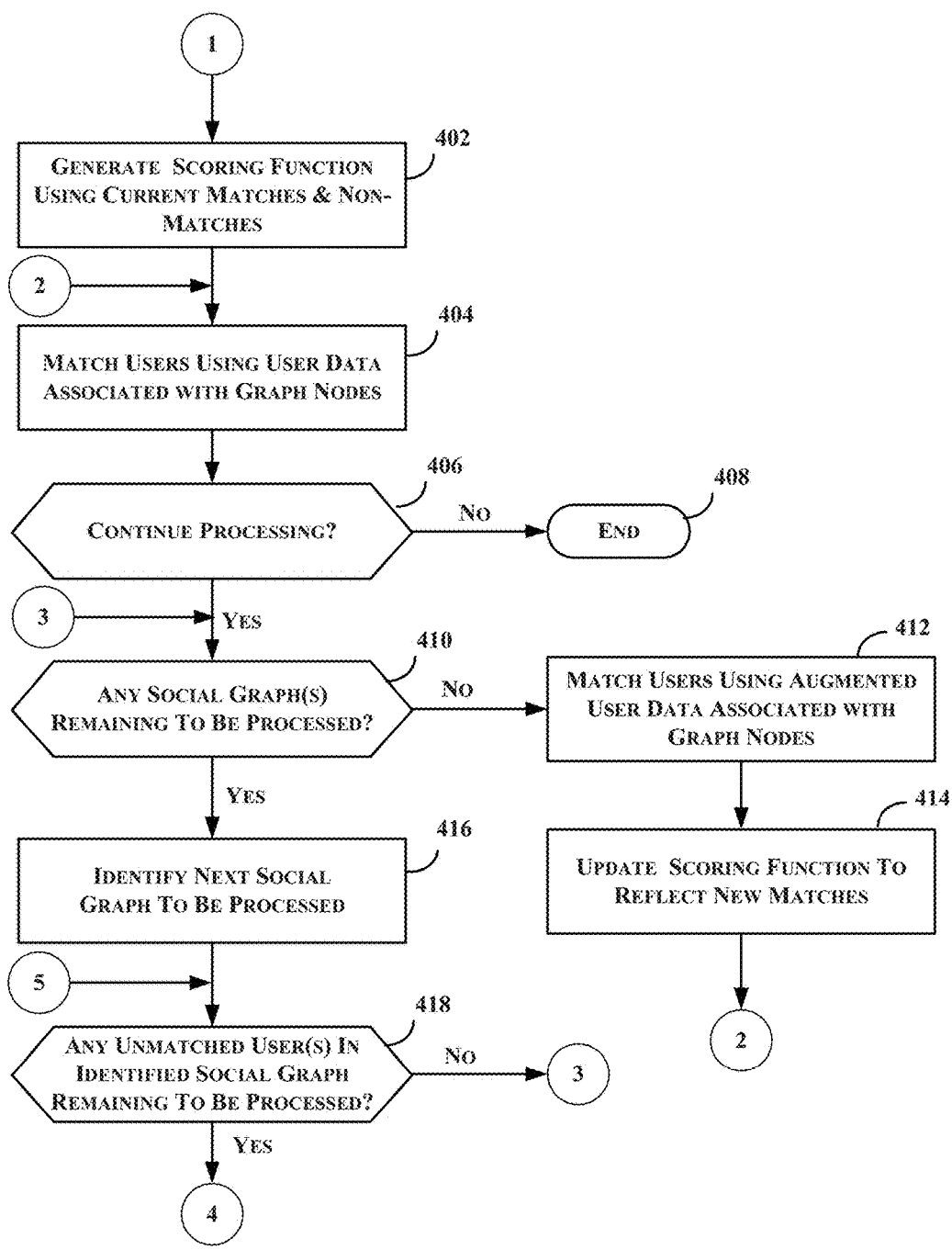
Figure 4B:
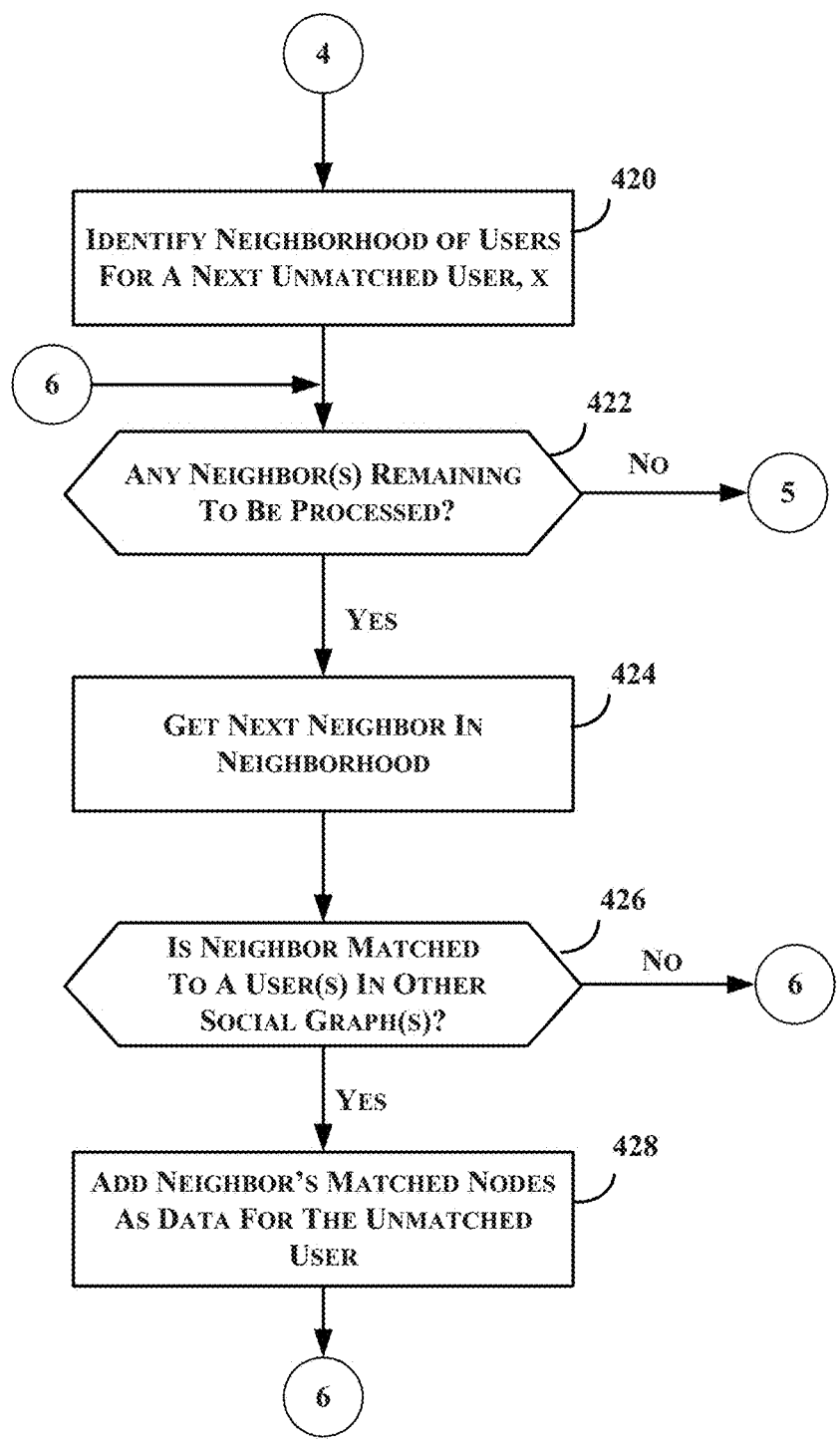

FIG. 4, which comprises FIGS. 4A and 4B, provides an example process flow which may be used in connection with one or more embodiments of the present disclosure. Referring to FIG. 4A, a matching algorithm, such as a scoring combined function, is generated at step 402. As is discussed herein, a combined scoring function may be trained using a set of matching users and a set of non-matching users. Additionally and as is discussed below, the combined scoring function may be updated using any new matches, e.g., matches that are found in phase one and/or phase two.

Users/nodes are matched using user data associated with the user/nodes of two or more social graphs, at step 404. By way of a non-limiting example, user data, such as and without limitation username(s), electronic mail address(es), etc., associated with one user/node of a pair of users/nodes is compared with the user data associated with the other user/node of the pair. By way of a further non-limiting example, the combined scoring function, which function may be a learned function generated at step 402, may be used to generate a score for a pair of users/nodes; the combined scoring function may comprise one or more scoring functions, each of which has an associated weight, and each scoring function of the combination may be based on one or more items, or fields, of user data, e.g., name(s), email address(es), phone number(s), geographic address(es), etc. A confidence level may also be associated with the score generated using the combined scoring function. By way of a non-limiting example, the score generated by the combined scoring function may be compared to a threshold score associated with an evidence condition; and a determination of whether or not a match is found may be based on the score generated by the scoring function satisfying the threshold score associated with evidence condition. As is discussed in more detail below, a level of confidence may be determined using a Bayesian approach, and may represent a confidence, or probability, that there is a match, M, given evidence, E. In accordance with one or more embodiments, a pair of users/nodes may be considered to match if a certain level, e.g., a threshold level, of confidence about the combined scoring function. Step 404 may be performed on multiple pairs of users/nodes across two or more social graphs to identify matching user/nodes across the two or more social graphs.

In accordance with one or more embodiments, step 404 may correspond to phase 202 of FIG. 2. At step 406, a determination is made whether to proceed to phase 204. Such a determination might be made based on whether or not there are any unmatched users/nodes after step 404 is completed. Additionally or alternatively, a determination to end processing may be based on reaching a certain number of iterations and/or identifying a sufficient number of matches. If a determination is made not to proceed to step 410, processing ends at step 408. Otherwise, processing continues at step 410 to augment information, or data, about any unmatched users in the social graph(s).

At step 410, a determination is made whether or not any social graph(s) remain(s) to be processed. If not, processing continues at step 412 to match users based on user data associated with graph nodes, which user data may include augmented information, such as one or more connections added to a user's data based on the user's neighborhood and the connection(s) associated with the user's neighborhood of users.

At step 414, a learning process may be used to update the scoring function, e.g., the combined scoring function, generated at step 402 to reflect any new matches. New matches may include, for example, matches found at step 404 and/or matches found at step 412. Processing continues at step 404 to search for any matches using the updated scoring function.

If it is determined, at step 410, that one or more social graphs remain to be processed, processing continues at step 416 to use a remaining social graph as the next social graph to be processed. At step 418, a determination is made whether or not the identified social graph has any unmatched user(s)/node(s). If not, processing continues at step 410 to process any remaining social graphs. If it is determined, at step 418, that there are one or more unmatched users in the identified social graph, processing continues at step 420 of FIG. 4B.

At step 420, a neighborhood of users comprising users connected, either directly or indirectly, to a next unmatched user x is identified. As discussed hereinabove, a user's neighborhood may comprise one or more users having a social connection with user x. The connection may be determined using edges connecting nodes in the user's social graph. As discussed herein, a neighborhood may be determined in any of a number of different ways without departing from the scope of the present disclosure.

At step 422, a determination is made whether there are any remaining neighbors, or users in the neighborhood identified at step 420. If not, processing continues at step 418 of FIG. 4A to process any remaining unmatched users in the current social graph. If it is determined, at step 422 of FIG. 4B, that there are users remaining in the neighborhood, processing continues at step 424 to get the next neighborhood in the neighborhood identified for user x. At step 426, a determination is made whether the neighbor is matched with a user in one or more other social graphs. If not, processing continues at step 422 to process any remaining neighbors in the neighborhood.

If it is determined, at step 426, that the neighbor is matched to at least one other user in at least one other social graph, processing continues to add the neighbor's matched nodes as data for the unmatched user x. With reference to FIG. 3, user data for unmatched user a(u_x) in social graph A may be augmented to reflect a connection with user b(u_a) in social graph B by virtue of user a(u_x)'s connection to user u_a, a member of user a(u_x)'s neighborhood, and user u_a being matched with user b(u_a) of social graph B. Referring again to FIG. 4B, each node from one or more social graphs matching the neighbor are added as data for the unmatched user x, such that user x becomes connected to each node from each social graph matching the neighbor of the unmatched user x. Processing continues at step 422 to process any remaining neighbors in the unmatched user x's neighborhood.

If it is determined, at step 422, that there are no neighbors remaining to be processed, processing continues at step 418 of FIG. 4A to process any remaining unmatched users in the current social graph. If it is determined, at step 418, that there are no unmatched users remaining to be processed, processing continues at step 410 to process any remaining social graphs. If it is determined, at step 410, that there are no more social graphs remaining to be processed, processing continues at step 412 to identify any new matches using user data, which may include the augmented data, e.g., the data added at step 428 of FIG. 4B, to a user's data.

By way of a non-limiting example, an unmatched user may be determined to match another user that is connected to one or more users matching a neighbor of unmatched user. With reference to FIG. 3, user a(u_x) may be considered to belong to user u_a's neighborhood in social graph A and user b(u_x) may be considered to belong to user b(u_a)'s neighborhood in social graph B, given that user u_a and user b(u_a) are the same user. The fact that user a(u_x) and b(u_x) both belong to the same neighborhood, e.g., the neighborhood of user u_a (and user b(u_a), across two or more social graphs may be used as at least an indication that user a(u_x) and b(u_x) are the same user. Other user data may also be used in determining whether or not users a(u_x) and b(u_x) match. By way of a non-limiting example, items of information, name(s), username(s), email address(es), phone number(s), etc., and/or portions thereof, e.g., n-length strings, may be used in addition to the augmented data, e.g., neighbor user's connection data added the unmatched user's data.

From step 412, processing continues at step 414 to update, e.g., re-train, the scoring function to reflect any new matches identified at step 412, and processing continues at step 404. Matches may be identified, at step 404, using the scoring function updated at step 414. Processing continues at step 406 to determine whether or not to continue processing. The determination may be made based on the number of unmatched users, e.g., a sufficient number of users have been matched, and/or the determination may be based on the number of iterations already performed, e.g., processing might be stopped if a certain number of iterations have already been performed, etc. If it is determined to proceed, processing continues at step 410. If not, processing may end at step 408.

As discussed herein, a confidence level, or confidence score, may be determined for a potential match. The confidence level may comprise a value, e.g., a probability, measuring a level of confidence that a match, e.g. a matching pair of users {x,y}, is indeed a real match. In a case that the match is a match between users x and y, the confidence level indicates a level of confidence that the match found by a match algorithm, e.g., a combined scoring function, is a real match. A confidence level may be determined for one or more scores generated by a combined scoring function, such that each of the one or more scores has an associated confidence level. A confidence level associated with a combined scoring function may be a probability that a score generated by the combined scoring function accurately represents reality. In other words, a confidence level may represent a calculated level of confidence that if the combined scoring function indicates a match between a pair of users/nodes, the pair of users/nodes are in actuality the same user/node; and, conversely, that a pair of users/nodes are in actuality not the same user/node if the combined scoring function indicates that the pair of users/nodes do not represent the sane user/node. In accordance with one or more such embodiments, a Bayesian approach may be used to determine a confidence score.

By way of a non-limiting example, assume that X and Y are sets of nodes corresponding to users in two different social networks, and M is a set of matched pairs, where each pair in M has a user x from X and a user y from Y that are considered to be the same person or entity. As discussed herein, embodiments of the present disclosure may be used to identify the set M. Additionally, assume a sampling, S, of confirmed matches, e.g., each match is known to be in M, and let E be a set of user pairs {x, y} that meet an evidence condition, e.g., each pair has a match score, such as a combined scoring function score, that satisfies a threshold score for the evidence condition. By way of a non-limiting example, an evidence condition may represent a given match score, a threshold match score, and the score for each user pair {x,y} in E is above the threshold. A confidence level may be determined, which indicates how well meeting the evidence condition indicates that a pair of users correspond, e.g., are the same user. The confidence level might be expressed as a probability of a match given the evidence, or P(M|E). Using Bayes' Rule, such a probability may be expressed as:

$$P(M|E)=P(E|M)P(M)/P(E),$$

where the probability of a match given a match score that satisfies a threshold may be determined using the probability of a match score satisfying the threshold given a match, a probability of a match and a probability of a match score exceeding the threshold score.

Figure 5:
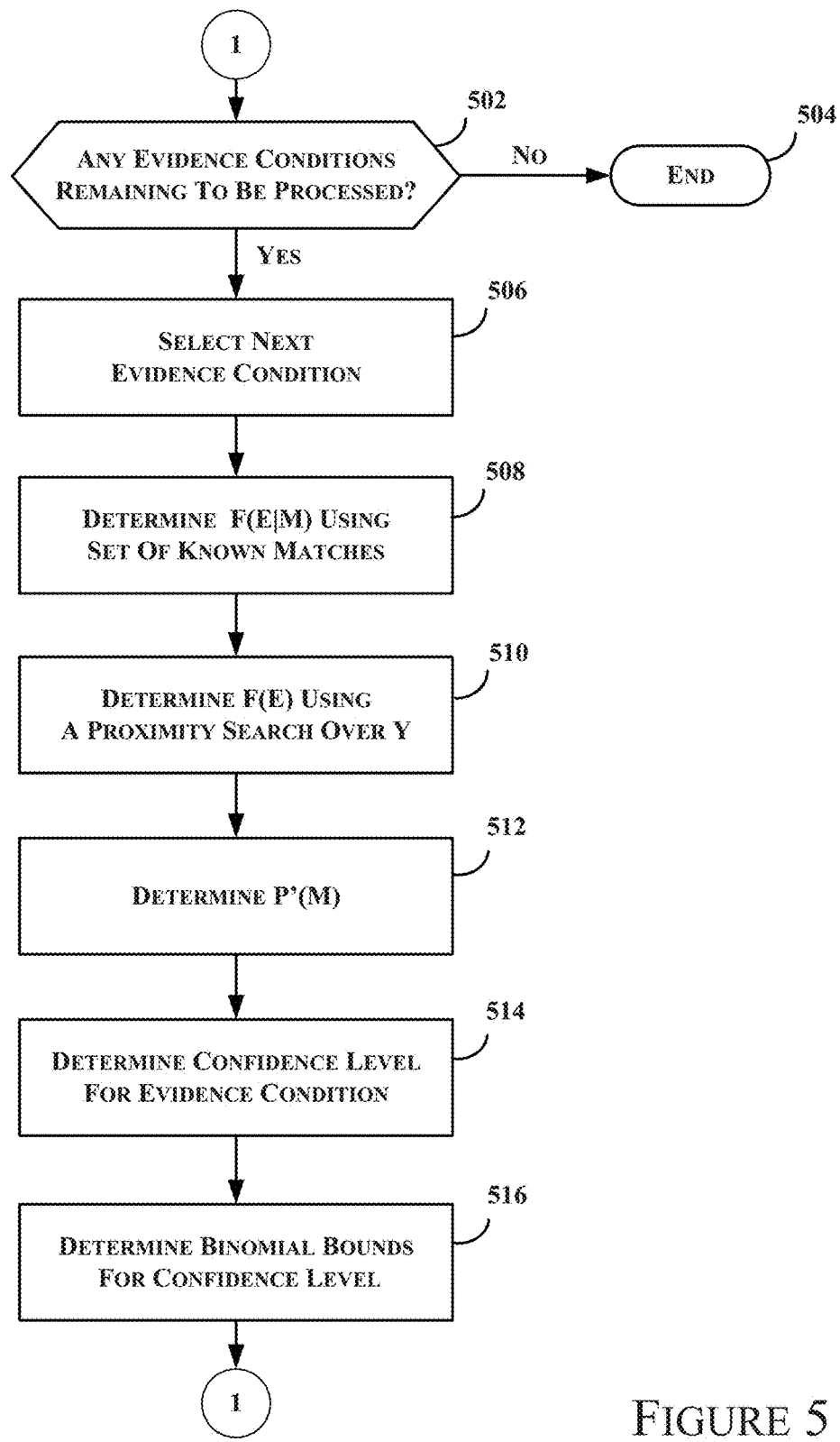

In accordance with one or more embodiments, P(E|M) may be approximated, or estimated, using estimates of P(E|M), P(M) and P(E). In accordance with one or more embodiments, estimates of P(E|M) and P(E) may be determined using a frequency, F( ). FIG. 5 provides a confidence level process flow in accordance with one or more embodiments of the present disclosure. By way of a non-limiting example, a process flow such as that shown in the example of FIG. 5 may be performed by match validation 108 in determining whether or not to accept a match found by social graph aggregator 104.

In the example shown in FIG. 5, a level of confidence may be determined for any number of evidence conditions, e.g., any number of match score thresholds. At step 502, a determination is made whether or not any evidence conditions remain to be determined. If not, processing ends at step 504. If so, processing continues at step 506 to select an evidence condition, e.g., a threshold match score that may be used to identify a set, E, of user pairs (x, y) that meet the evidence condition. At step 508, an approximation, or estimation, of the probability of match given a current evidence condition, P(E|M) is determined. By way of a non-limiting example, P(E|M) may be approximated using a frequency, F(E|M), which may be expressed as follows:

$$F(E|M)=1/|S|\mathrm{sum}\_\{\{x,y\}\ \mathrm{in}\ S\}\ I(\{x,y\}\ \mathrm{in}\ E),$$

where I( ) is an indicator function indicating true or false, e.g., one if the argument is true and zero if false. S denotes a sampling, or set, of confirmed matches, and |S| is the number of matches in the set. The value of F(E|M) represents a number of the matches in S that have a match score in E, e.g., a match score satisfying the evidence condition, which may be a threshold score. The probability P(E|M) may be approximated as a frequency, or the number, of matches in S that have a match score satisfying the evidence condition.

At step 510, an approximation of P(E), or the probability of a score exceeding the threshold score, is determined. An approximation of P(E) may be determined as a frequency, F(E), which may be expressed as:

$$F(E)=1/|T|1/|Y|\mathrm{sum}\_\{x\ \mathrm{in}\ T\}\ n(x),$$

where T is a sampling, e.g., a uniform random sampling, of nodes in X, |T| is the number of nodes in T and |Y| is the number of nodes in Y. As is discussed below, n(x) is determined for each user x in T and represents the number of users in Y that match user x, or the number of {x,y} pairs for the user x; the number of users in Y that match user x with a match score in E, e.g., a match score satisfying the evidence condition, such as threshold match score, used for E.

By way of a non-limiting example, a proximity search may be performed to identify a set of users in Y that most closely match a user x in X, relative to others users in Y. The search may include a ranking of the users in Y based on each user y's matching with user x based on user data, with the ranking being used to identify the top, h, users in Y as the closest matches to user x based on user data and relative to other users in Y. By way of a further non-limiting example, users in Y may be ranked based on each user y's user data similarity to user x's user data, and a top number, h, of the users in Y may be selected based on the ranking, e.g., the number, h, selected users from Y that have user data that is closest to user x's user data relative to other users in Y. User data for each user y in the set of users identified in the proximity search is compared with user x's user data to determine those users in the set whose user data is sufficiently similar to user x's user data to be considered a match by the matching algorithm, e.g., the combined scoring function described in connection with one or more embodiments would generate a score that is greater than the threshold score used for E.

Assume for the sake of example and without limitation that a proximity search identified 100 closest matches in Y. The proximity search may be conducted using user x's profile data, e.g., some or all of the profile data, and profile data of users in Y to identify the 100 closest matching users in Y to user x. In a case that user x is a LINKEDIN user and Y comprises a set of nodes from a FACEBOOK social graph, some or all of user x's LINKEDIN user profile might be compared with some or all of the user profiles of FACEBOOK users to identify the 100 closest matches for user x. Each user y's FACEBOOK user profile might be evaluated against user x's LINKEDIN user profile to identify which of the 100 closest matches are close enough that the matching algorithm would consider user y to be a match for user x, e.g., user x and user y are the same person or entity. Assuming that of the 100 closest matches 59 are close enough that the matching algorithm would identify a match. A probability of finding a match for user x over all of the users in Y may be expressed as 59%, or 59/100. By way of a non-limiting example, the lower the determined probability, the greater the confidence may be.

The above example involved one user x in T. A similar approach may be used for each user x in T. More particularly and for each user x in T, a proximity search may be performed over Y to generate a set of users y in Y, and each user y in the result set may be evaluated to determine a number of users, n(x), in the result set from Y that would be considered a match for the user x in T by the matching algorithm with a score sufficient to satisfy the evidence condition set for E. As shown in the above expression for F(E|M), the values of n(x) for the users x in T are summed in determining F(E|M).

Figure 6:
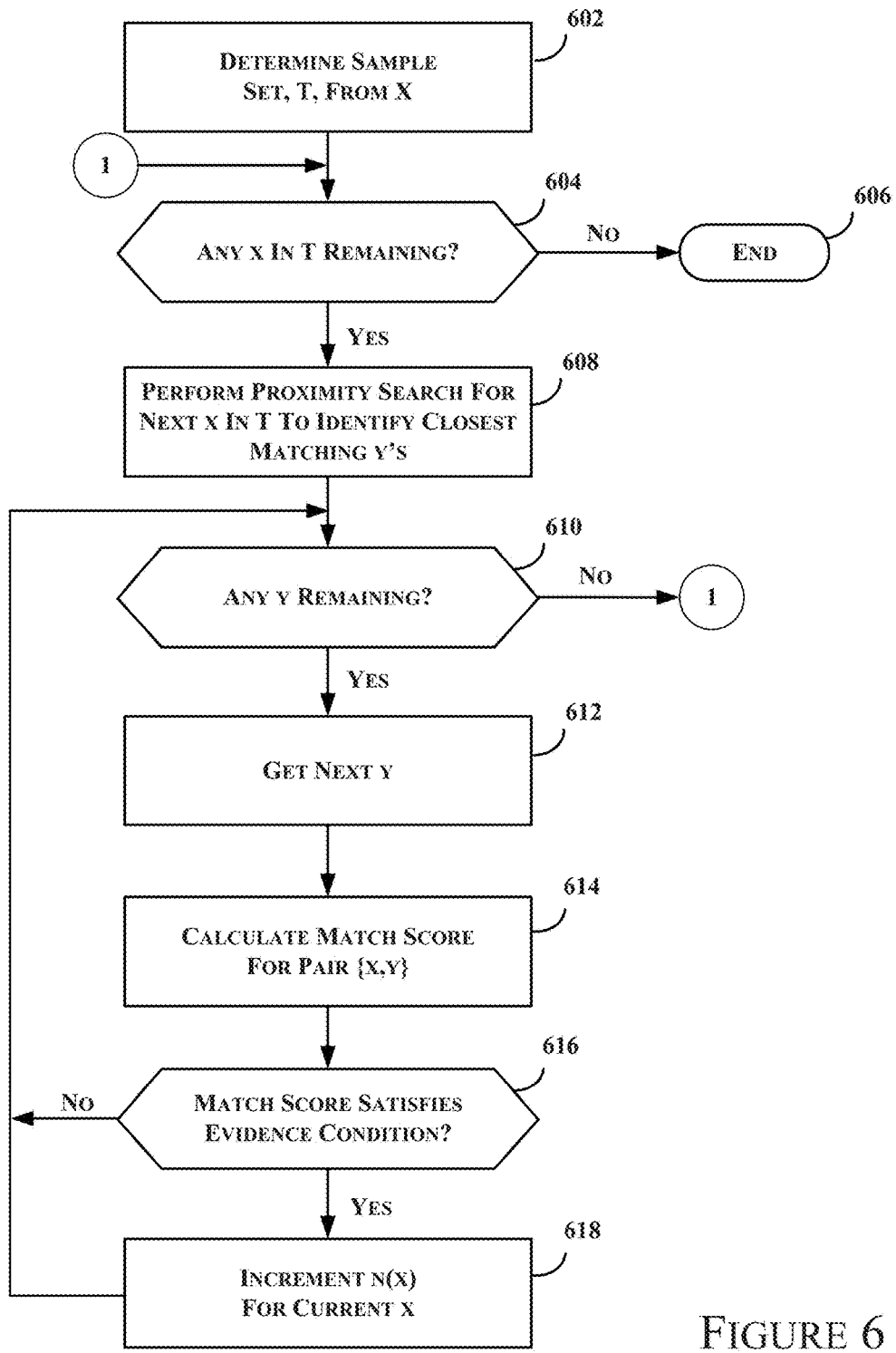

FIG. 6 provides a match score frequency determination process flow in accordance with one or more embodiments of the present disclosure. The value of n(x) determined for each user x in T in the example shown in FIG. 6 may be used to determine F(E).

At step 602, the sampling T is determined, e.g., a random sampling of nodes in X. At step 604, a determination is made whether any users x in T remain to be processed. If not, processing ends at step 606. If there are users x in T remaining to be processed, processing continues at step 608. At step 608, the next user x in T is selected.

In accordance with one or more embodiments, for each user x in T, a proximity search may be performed over Y to identify a number of users y in Y having user data that is closest to user x's user data and a determination is made which of the closest matching users in Y are considered to be matches by the matching algorithm. At step 608, some or all of the user data for a user x in T may be used to perform a search, e.g., a proximity search, of the user data of users in Y to identify those user(s) in Y having user data that matches most closely with user x's user data. At step 610, a determination is made whether any user y, e.g., any of the closest matching users found in Y, remain to be processed. If not, processing continues at step 604 to process any remaining users x in T. If it is determined, at step 610, that there are one or more of the closest matching users y remaining to be processed, processing continues at step 612 to get the next user y. At step 614, a match score is calculated for users x and y, e.g., the matching algorithm is used to determine a match score.

At step 616, a determination is made whether the match score satisfies the evidence condition, e.g., the match score determined in step 614 exceeds a threshold score. If not, processing continues at step 610 to process any remaining closest matching user(s) y. If it is determined, at step 616, that the match score satisfies the evidence condition, processing continues at step 618 to increment the count, n(x) for the current user x, and processing continues at step 610 to process any remaining closest matching user(s) y.

Referring again to FIG. 5, an estimate of P(M) is determined at step 512. An estimate, P'(M) for P(M), or an estimate of the probability of a match, may be determined to be the number of matches divided by the number of nodes in X, |X|, times the number of nodes in Y, |Y|, or number of matches divided by |X||Y|. For example, if may be known that about 70% of users in social network X are also in social network Y, then P(M) may be estimated as 0.7/|Y|.

At step 514, a confidence level, P(M|E) is determined. As discussed above, P(M|E) represents the probability of a match given E, where E represent a set of pairs {x,y}, each of which has a match score satisfying a threshold match score for E. P(M|E) may be approximated using F(E|M), P'(M) and F(E) as follows:

$$P(M|E) \text{ is approximately } F(E|M)P'(M)/F(E)$$

In other words, a level of confidence, P(M|E), may be approximated using estimations of P(E|M), P(M) and P(E), which estimations may be determined to be a frequency, as discussed above.

By way of a non-limiting example, assuming that a resulting approximation is 85% using the above, it might be said that if a score satisfies the threshold score for E, then there is 85% confidence that the match identified by the matching algorithm is in actuality a match.

In accordance with one or more embodiments, binomial bounds, such as and without limitation Hoeffding, empirical Bernstein, directly computed, etc., may be used to account for differences between the frequencies such as those computed above and actual probabilities. Thus, at step 516, binomial bounds are determined. Assume that P+( ) and P−( ) are frequency-based upper and lower bounds for a probability P( ), with bound failure probability delta for each bound, then a confidence bound may be expressed as:

$$P(M|E) > P-(E|M)P'(M)/P+(E),$$

with probability at least 1-2 delta, assuming P'(M) is a lower bound on P(M), e.g., using a conservative estimate of P(M).

Binomial bounds may be used to provide an additional level of confidence. By way of a non-limiting example, using binomial bounds, assuming that there is an 85% confidence level that a match identified by the matching algorithm is actually a match, an added level of confidence provided using binomial bounds is to say that there is 95% confidence in saying that there is an 85% confidence that a match identified by the matching algorithm is actually a match.

Processing may be continued, at step 502, to process any remaining evidence condition. As discussed above, the probability of a match given an evidence condition, or P(M|E), may be determined for different evidence conditions. Recall that an evidence condition may be indicated as a threshold match score, such that a match score generated for a pair {x,y} exceeding the threshold is considered to belong the E. A level of confidence, P(M|E), may be determined for different scoring thresholds. For each evidence condition, a proximity search may be performed over Y for each x in T to identify how many neighbors y to x in Y have a proximity score on {x,y} high enough to be declared a match, to generate an estimate, F(E) for P(E) for a given evidence condition. Similarly and for a given evidence condition, an estimate, F(E|M), of P(E|M) may be determined. An approximation of P(M|E) for the given evidence condition may be determined using F(E|M), P'(M) and F(E), as discussed above.

One or more determined level(s) of confidence may be used in estimating the accuracy and/or effectiveness of a matching algorithm, e.g., a matching algorithm such as a combined scoring function used in identifying a matching pair of users across multiple different social network, as is discussed in connection with one or more embodiments of the present disclosure. In accordance with one or more embodiments, one or more level(s) of confidence may be determined for multiple different matching algorithms and used to select an appropriate matching algorithm, or algorithms, having a desired level of accuracy and/or effectiveness. Additionally, some matching techniques might produce a matching score for each match, and the confidence measure associated with each may assist in determining whether or not to use individual matches.

As discussed above, embodiments of the present disclosure estimate the accuracy of techniques for matching users across multiple different social networks using sample matches, a sampling method and a search method to find the highest scoring match candidates for a sample of items among the available data. Outputs may be combined through Bayesian statistics and binomial sampling estimation to produce accuracy estimates for matching techniques and confidence scores for matches.

In the above discussion, a pair of users are matched with a level of confidence being determined for the match. In accordance with one or more embodiments, a confidence level may be determined for a pair of fields determined to correspond to the same user, where the confidence level may identify a level of confidence in the determination that the field in the pair are belong to the same person. By way of some non-limiting example, two or more fields in an entry in an address book might be considered to correspond to the same entity and a phone number found in the body of an email might be considered to be the email sender's telephone number. The level of confidence that the fields in an address book entry are for the same person is typically greater than the level of confidence that a phone number in a single email is the email sender's telephone number. Although, the more emails from the email sender containing the same telephone number may increase the level of confidence that the telephone number is the sender's telephone number.

By way of a non-limiting example, in a case that an email address from a sender to receiver is matched with a user-friendly name, e.g., Dad, the user-friendly name for the email sender might be used as a replacement for the email address in the "from" field of the email directed to the receiver. In this example, one or more previous email(s) to the sender from the receiver may have included the salutation "Dad", "Hey Dad", etc. In such a case, a nickname field with the value of "Dad" might be associated with an email address field with the value of Dad's email address. In a case that an email is received and the sender's email address is the same one associated with "Dad," the sender's email address might be replaced with the user-friendly name "Dad".

Of course, it should be apparent that any pair of data fields may be matched. In matching, or aggregating, data fields, pairs of data fields may be identified as referring to the same item, a person, entity etc.

Data fields may be associated with one or more users from one or more different social graphs and/or from a combination of two or more different social graphs combined in accordance with one or more embodiments of the present disclosure.

One or more determined level(s) of confidence may be used in estimating the accuracy and/or effectiveness of a field matching algorithm used to match data fields. In accordance with one or more embodiments, one or more level(s) of confidence may be determined for multiple different field matching algorithms and used to select an appropriate field matching algorithm, or algorithms, having a desired level of accuracy and/or effectiveness. Additionally, some matching techniques might produce a matching score for each match, and the confidence level associated with a matching score may assist in determining whether or not to identify two fields as being a match.

In accordance with one or more embodiments of the present disclosure, accuracy of techniques for matching, or aggregating, fields may be determined using sample matches, the sampling method and the search method to find the highest scoring match candidate for a sample items among the available data. Outputs may be combined through Bayesian statistics and binomial sampling estimation to produce accuracy estimates for matching techniques and confidence scores for matches.

Figure 7:
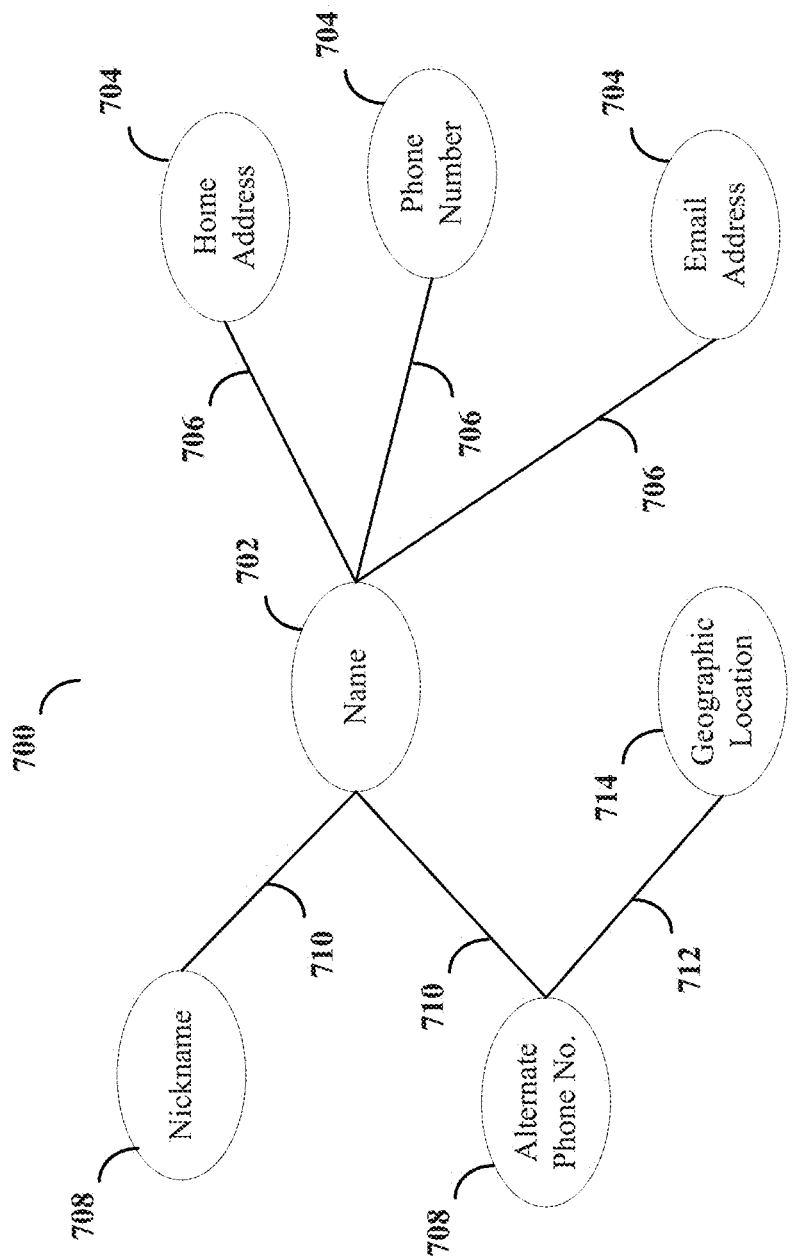

FIG. 7 provides an example of a set of nodes in a data field network in accordance with one or more embodiments of the present disclosure. In the example of FIG. 7, network 700 has a number of nodes 702, 704, 708 and 714, each of which is associated with a data field, e.g., name, home address, phone number, email address, nickname, the geographic location, alternate phone number, etc. Edges 706, 710 and 712 represent a connection between two fields. By way of a non-limiting example, an edge 710 represents a connection between the node 702 representing a name and node 708 representing a nickname. Each edge represents a hop, and a pair of nodes may be connected directly, e.g., by way of a single hop, and/or indirectly, e.g., by way of multiple hops. In the example, node 714 representing a geographic location data field is directly connected to node 708 representing an alternate phone number via edge 712 and is connected indirectly to the node 702 representing a name data field via edges 712 and 710 and node 708 representing an alternate phone number data field.

Each edge may have an associated value representing a degree of strength of the connection between the data fields represented by the pair of nodes connected by the edge. By way of a non-limiting example, edge 706 representing a connection between the name and phone number fields retrieved from the entity's address book entry might be considered to be a stronger connection than the connections between the name field and the nickname and geographic location fields, which connections might be identified by analyzing a number of email messages. On the other hand, there may be a strong connection between the name data field and the nickname and/or geographic location field(s) where these fields are identified from an address book entry.

In the example shown in FIG. 7, network 700 may comprise nodes corresponding to the same entity, e.g., person, organization, group of people, etc.; however, it should be apparent that network 700 may comprise nodes corresponding to different entities. In any case, embodiments of the present disclosure may be used to determine a level of confidence in a matching algorithm that matches pairs of fields and/or identifies matches fields to an entity. By way of a non-limiting example, a strength of the connection associated with an edge may correspond to the score generated by a matching algorithm and/or a confidence level associated with a score generated by the matching algorithm.

Figure 8:
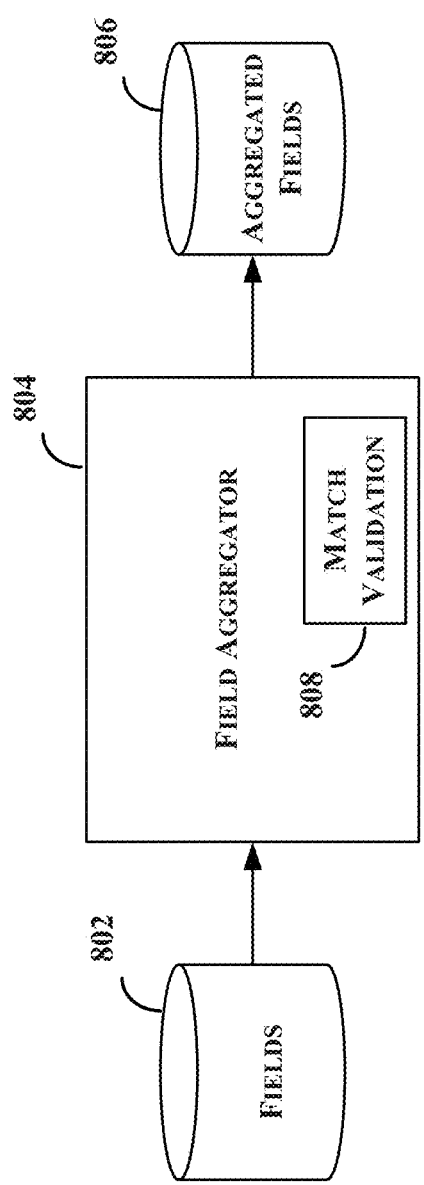

FIG. 8 provides an example of a general overview of system components that may be used in connection with one or more embodiments of the present disclosure.

Element 802 of FIG. 8 represents a number of fields, each of which may or may not be associated with an entity. By way of a non-limiting example, fields 802 may comprise fields such as those shown in FIG. 7, as well as any number of other fields.

Element 804 represents one or more computing devices, which may form a system, to aggregate fields for a given entity. By way of a non-limiting example, field aggregator may process fields 802 to identify connections between fields for a given entity. An entity might be an individual, or person, a company, a group of people, etc. Field aggregator 804 may be any data field aggregator, e.g., implement any data field matching technique(s), now known or later developed.

In accordance with one or more embodiments, element 804 may comprise a match validator 808, which may be used to validate a match identified by field aggregator 804, e.g., a match indicating that a pair of fields correspond to the same entity. Field aggregator 804 may implement the process flows shown in FIGS. 5 and 6, for example.

As discussed herein, a confidence level, or confidence score, may be determined for a potential match. The confidence level may comprise a value, e.g., a probability, measuring a level of confidence that a match, e.g. a pair of fields identified by field aggregator 804 correspond to the same entity. The confidence level may indicate a level of confidence that the match found by a match algorithm, e.g., a match algorithm used by field aggregator 804, is a real match. A confidence level may be determined for one or more scores generated by a field aggregation, or field matching, algorithm, such that each of the one or more scores has an associated confidence level. A confidence level associated with a field aggregation algorithm may be a probability that a score generated by the field aggregator accurately represents reality, e.g., that two or more aggregated data fields in reality correspond to the same entity. In other words, a confidence score may represent a calculated level of confidence that if field aggregator 804 identifies a correspondence between two data fields, the data fields correspond to the same entity; and, conversely, that a pair of data fields that do not in actuality correspond and/or are not associated with the same entity, if the field aggregator 804 indicates that data fields do not correspond and/or are not associated with the same entity. In accordance with one or more such embodiments, a Bayesian approach may be used to determine a confidence score.

By way of a non-limiting example, assume that X represents a set of fields, such as and without limitation the fields shown in the example of FIG. 7, and M is a set of matched pairs, where each pair comprises a first data field x from X and a second data field y from X, where fields x and y are different fields in X and where fields x and y correspond to the same entity, e.g., person. Additionally, assume a sampling, S, of confirmed matches known to be in M, and let E be a set of data field pairs {x, y} that meet an evidence condition, e.g., each pair has a match score, such as a score generated by field aggregator 804, that satisfies a threshold for the evidence condition. By way of a non-limiting example, an evidence condition may represent a given match score, a threshold match score, such that the match score for each user pair {x,y} is above the threshold, which may be represented as s(x,y)>t, where s is a scoring function which may be based on hops in a network of fields, such as the network and hops/edges shown in FIG. 7, and t is a threshold match score, or value. A confidence level may be determined, which indicates how well meeting the evidence condition indicates that a pair of fields correspond. The confidence level might be expressed as a probability of a match given the evidence, or P(M|E). Using Bayes' Rule, such a probability may be expressed as:

$$P(M|E)=P(E|M)P(M)/P(E),$$

where the probability of a match given a match score that satisfies a threshold may be determined using the probability of a match score satisfying the threshold given a match, a probability of a match and a probability of a match score exceeding the threshold score.

In accordance with one or more embodiments, P(E|M) may be approximated, or estimated, using estimates of P(E|M), P(M) and P(E). In accordance with one or more embodiments, estimates of P(E|M) and P(E) may be determined using a frequency, F( ). FIG. 5 provides a confidence level process flow in accordance with one or more embodiments of the present disclosure. By way of a non-limiting example, a process flow such as that shown in the example of FIG. 5 may be performed by match validation 808 in determining whether or not to accept a match found by field aggregator 804.

In the example shown in FIG. 5, a level of confidence may be determined for any number of evidence conditions, e.g., any number of match score thresholds. At step 502, a determination is made whether or not any evidence conditions remain to be determined. If not, processing ends at step 504. If so, processing continues at step 506 to select an evidence condition, e.g., a threshold match score that may be used to identify a set, E, of field pairs {x, y} that meet the evidence condition. At step 508, an approximation, or estimation, of the probability of match given a current evidence condition, P(E|M) is determined. By way of a non-limiting example, P(E|M) may be approximated using a frequency, F(E|M), which may be expressed as follows:

$$F(E|M)=1/|S|\text{sum}\_\{\{x,y\} \text{ in } S\} I(\{x,y\} \text{ in } E),$$

where I( ) is an indicator function indicating true or false, e.g., one if the argument is true and zero if false. S denotes a sampling, or set, of confirmed matches, and |S| is the number of matches in the set. The value of F(E|M) represents a number of the matches in S that have a match score in E, e.g., a match score satisfying the evidence condition, which may be a threshold match score. The probability P(E|M) may be approximated as a frequency, or the number, of matches in S that have a match score satisfying the evidence condition.

At step 510, an approximation of P(E), or the probability of a score exceeding the threshold score, is determined. An approximation of P(E) may be determined as a frequency, F(E), which may be expressed as:

$$F(E)=1/|T|1/(|X|-1)\text{sum}\_\{x \text{ in } T\} n(x),$$

where T is a sampling, e.g., a uniform random sampling, of nodes in X, |T| is the number of nodes in T, |X| is the number of nodes in X, and |X|−1 is the number of nodes in X excluding a current node in X. In addition, n(x) represents a number of y's in X-{x} such that {x,y} have a match score that is in E, where the matching score is generated by a match algorithm for which the confidence level is being determined.

As is discussed in more detail below, for each x in X, a search is performed over nodes in X other than x, e.g., X-{x}, to identify a set of nodes that closely match x. By way of a non-limiting example, X may be searched to identify those nodes that are within a given number of hops of x's node. Each such identified node in X may be represented as y. Each node y is paired with x, e.g., {x,y}, and the matching algorithm is used to generate a match score for the pair {x,y} to determine the number, n(x) of pairs {x,y} for which the matching algorithm generated a match score satisfying the evidence condition, e.g., have a match score satisfying the evidence condition, such as threshold match score, used for E.

The above approach may be performed for each x in T. More particularly and for each data field x in T, a proximity search may be performed over X-{x} to generate a set of data fields y in X-{x} that closely match x, e.g., are within a given number of hops. Each data field y in the result set may be evaluated to determine a number of data fields/nodes, n(x), in the result set from the proximity search that would be considered a match for the data field x in T by the matching algorithm with a score sufficient to satisfy the evidence condition set for E. As shown in the above expression for F(E|M), the values of n(x) for the data fields x in T are summed in determining F(E|M).

With reference to FIG. 6, n(x) used to determined F(E) is determined for each data field x in T. At step 602, the sampling T is determined, e.g., determine a number of data fields, or nodes, each referred to as y, in X-{x} that are within a certain number of hops of data field/node x. At step 604, a determination is made whether any data fields x in T remain to be processed. If not, processing ends at step 606. If there are data fields x in T remaining to be processed, processing continues at step 608. At step 608, the next data field x in T is selected.

In accordance with one or more embodiments, for each data field x in T, a proximity search may be performed over X-{x} to identify a number of the closest matches, each referred to as y, in X-{x}. It should be apparent that any technique may be used to find the closest matching data fields. At step 610, a determination is made whether any data field y, e.g., any of the closest matching data fields found in X-{x}, remain to be processed. If not, processing continues at step 604 to process any remaining data fields x in T. If it is determined, at step 610, that there are one or more of the closest matching data fields y remaining to be processed, processing continues at step 612 to get the next data field y. At step 614, a match score is calculated for data fields x and y, e.g., the matching algorithm is used to determine a match score.

At step 616, a determination is made whether the match score satisfies the evidence condition, e.g., the match score determined in step 614 exceeds a threshold score. If not, processing continues at step 610 to process any remaining closest matching data field(s) y. If it is determined, at step 616, that the match score satisfies the evidence condition, processing continues at step 618 to increment the count, n(x) for the current data field x, and processing continues at step 610 to process any remaining closest matching data field(s) y.

Referring again to FIG. 5, an estimate of P(M) is determined that step 512. Given that a pair {x,y} is chosen at random, an estimate, P'(M), for P(M) may be based on a number of entities represented by the data fields in network X, e.g., network 700, and an estimate of the distribution of the number of fields per person. By way of a non-limiting example, assume that there are 100 million people, and that 10% of the entities have one data field, 20% have two fields, 30% have three fields and 40% have four fields, then P'(M) might be expressed as:

$$P'(M)=[100\text{ million}[0.1(1)(0)+02(2)(1)+03(3)(2)+0.4(4)(3)]]/[(|X|)(|X|-1)],$$

where the numerator represents the number of matching pairs and the denominator represents a count of all pairs.

At step 514, a confidence level, P(M|E) is determined. As discussed above, P(M|E) represents the probability of a match given E, where E represent a set of pairs {x,y}, each of which has a match score satisfying a threshold match score for E. P(M|E) may be approximated using F(E|M), P'(M) and F(E) as follows:

$$P(M|E)\text{ is approximately }F(E|M)P'(M)/F(E)$$

In other words, a level of confidence, P(M|E), may be approximated using estimations of P(E|M), P(M) and P(E), which estimations may be determined as a frequency, as discussed above.

By way of a non-limiting example, assuming that a resulting approximation is 85% using the above, it might be said that if a score satisfies the threshold score for E, then there is 85% confidence that the match identified by the matching algorithm is in actuality a match.

In accordance with one or more embodiments, binomial bounds, such as and without limitation Hoeffding, empirical Bernstein, directly computed, etc., may be used to account for differences between the frequencies such as those computed above and actual probabilities. Thus, at step 516, binomial bounds are determined. Assume that P+( ) and P−( ) are frequency-based upper and lower bounds for a probability P( ), with bound failure probability delta for each bound, then a confidence bound may be expressed as:

$$P(M|E)>P-(E|M)P'(M)/P+(E),$$

with probability at least 1-2 delta, assuming P'(M) is a lower bound on P(M), e.g., using a conservative estimate of P(M).

Binomial bounds may be used to provide an additional level of confidence. By way of a non-limiting example, using binomial bounds, assuming that there is an 85% confidence level that a match identified by the matching algorithm is actually a match, an added level of confidence provided using binomial bounds is to say that there is 95% confidence in saying that there is an 85% confidence that a match identified by the matching algorithm is actually a match.

Processing may be continued, at step 502, to process any remaining evidence condition. As discussed above, the probability of a match given an evidence condition, or P(M|E), may be determined for different evidence conditions. Recall that an evidence condition may be indicated as a threshold match score, such that a match score generated for a pair {x,y} exceeding the threshold is considered to belong the E. A level of confidence, P(M|E), may be determined for different scoring thresholds.

One or more determined level(s) of confidence may be used in estimating the accuracy and/or effectiveness of a matching algorithm used to match data fields. In accordance with one or more embodiments, one or more level(s) of confidence may be determined for multiple different matching algorithms and used to select an appropriate matching algorithm, or algorithms, having a desired level of accuracy and/or effectiveness. Additionally, some matching techniques might produce a matching score for each match, and the confidence measure associated with each may assist in determining whether or not to use individual matches.

Figure 9:
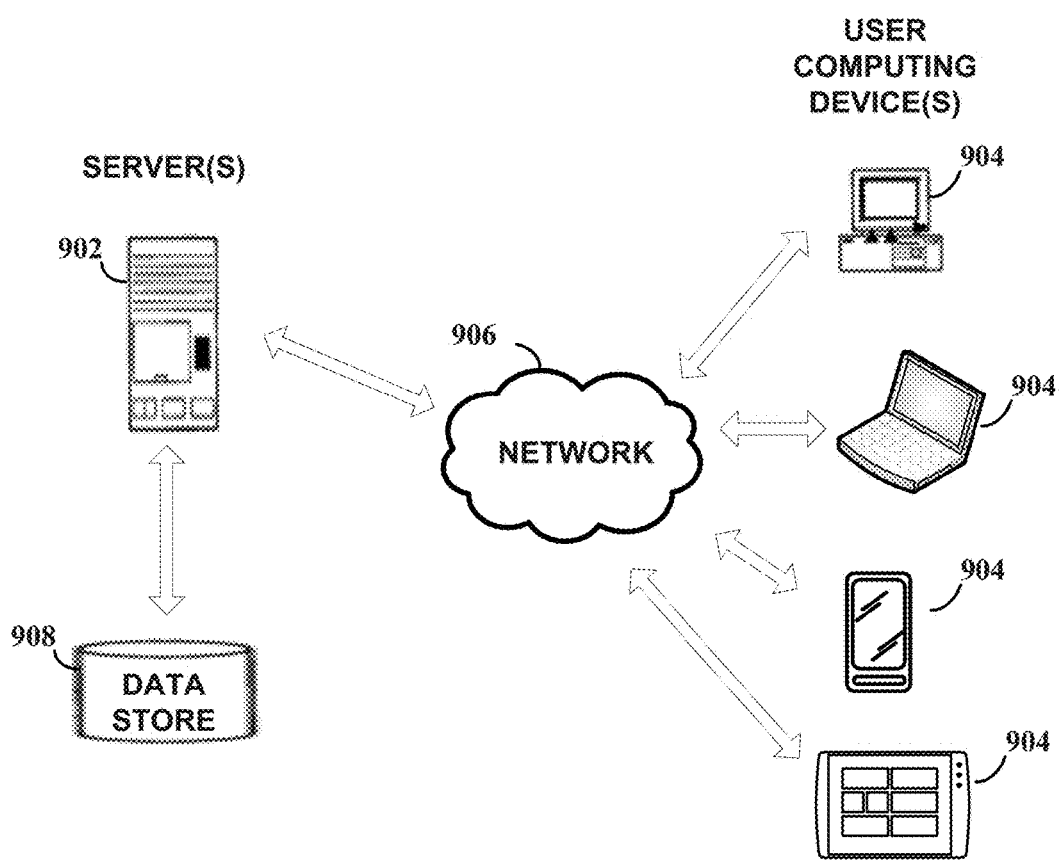
FIG. 9 illustrates some components that can be used in connection with one or more embodiments of the present disclosure.

FIG. 9 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 902 can be configured to execute program code, instructions, etc. to provide functionality in accordance with one or more embodiments of the present disclosure.

Computing device 902 can serve content to user computing devices 904 using a browser application via a network 906. Data store 908 may comprise program code to configure a server 902, or other computing device, to execute functionality in accordance with one or more embodiments of the present disclosure.

The user computing device 904 may be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 902 and the user computing device 904 can include one or more processors, memory, a removable media reader, network interface, display and interface, and one or more input devices, e.g., keyboard, keypad, mouse, etc. and input device interface, for example. One skilled in the art will recognize that server 902 and user computing device 904 may be configured in many different ways and implemented using many different combinations of hardware, software, or firmware.

In accordance with one or more embodiments, a computing device 902 can make a user interface available to a user computing device 904 via the network 906. The user interface made available to the user computing device 904 can include content items, or identifiers (e.g., URLs) selected for the user interface in accordance with one or more embodiments of the present invention. In accordance with one or more embodiments, computing device 902 makes a user interface available to a user computing device 904 by communicating a definition of the user interface to the user computing device 904 via the network 906. The user interface definition can be specified using any of a number of languages, including without limitation a markup language such as Hypertext Markup Language, scripts, applets and the like. The user interface definition can be processed by an application executing on the user computing device 904, such as a browser application, to output the user interface on a display coupled, e.g., a display directly or indirectly connected, to the user computing device 904.

In an embodiment the network 906 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 9. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 10:
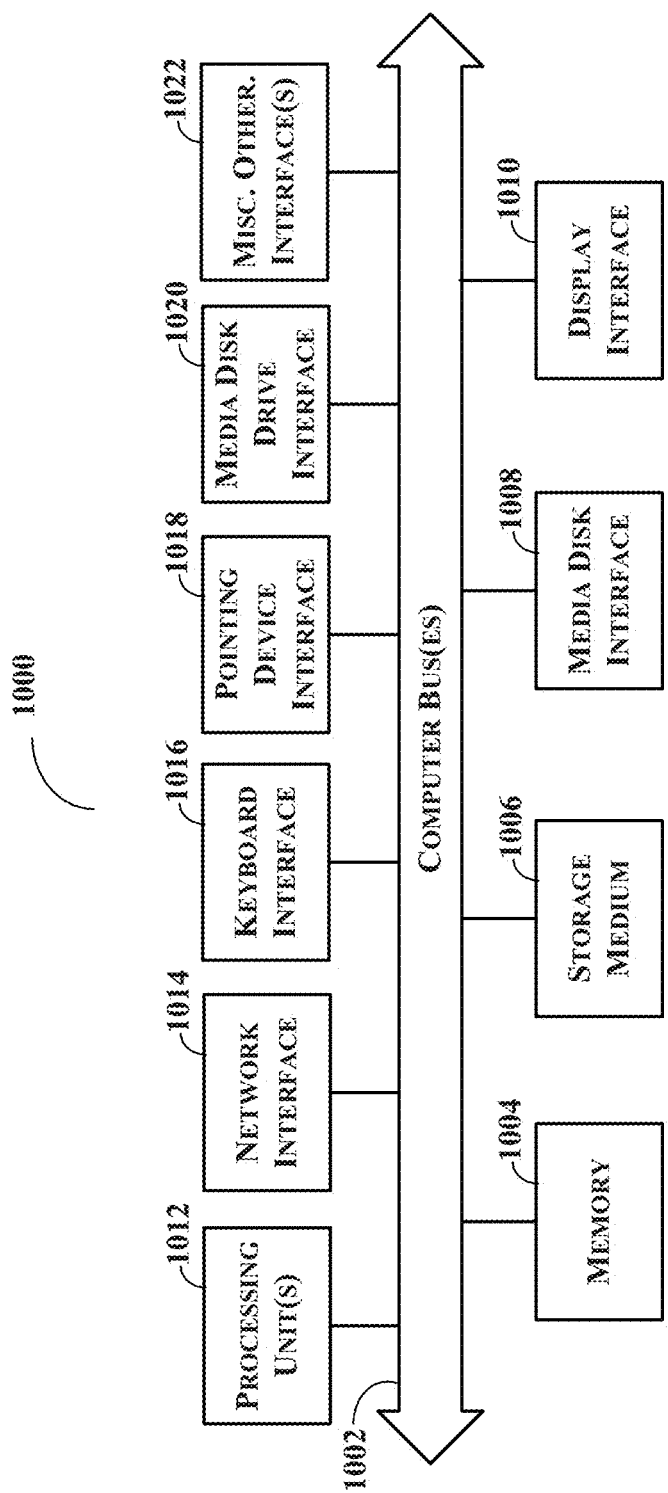
FIG. 10 is a detailed block diagram illustrating an internal architecture of a computing device in accordance with one or more embodiments of the present disclosure.

FIG. 10 is a detailed block diagram illustrating an internal architecture of a computing device, e.g., a computing device such as server 902 or user computing device 904, in accordance with one or more embodiments of the present disclosure. As shown in FIG. 10, internal architecture 1000 includes one or more processing units, processors, or processing cores, (also referred to herein as CPUs) 1012, which interface with at least one computer bus 1002. Also interfacing with computer bus 1002 are computer-readable medium, or media, 1006, network interface 1014, memory 1004, e.g., random access memory (RAM), run-time transient memory, read only memory (ROM), etc., media disk drive interface 1020 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, computer-readable storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage, e.g., medium/media 1006, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
analyzing, by an electronic social networking system server, a plurality of different social graphs and generating a combined social graph from the plurality of different social graphs, each social graph of the plurality corresponding to a social network and each social graph and the combined social graph comprising a plurality of nodes and a plurality of edges each connecting a pair of nodes of the plurality of nodes, the analyzing comprising comparing user data to identify node matches across a number of the plurality of different social graphs and using social connections among users represented in the plurality of different social graphs to augment user data associated with a number of the nodes, the augmented user data being used in identifying node matches, comparison of user data of a pair of users from different social graphs of the plurality comprising:
comparing the user data associated with the pair of users to determine a score for the pair of users, the determined score representing a degree to which the user data associated with the pair of users match;
making an inconclusive initial determination that the pair of users are the same user using the determined score;
in response to the inconclusive initial determination using the determined score, the determination further comprising:
identifying a user neighborhood comprising a number of users for each user of the pair;
augmenting the user data for a user of the pair using user data for at least one user in the user neighborhood identified for the user; and
using augmented user data for at least one of the users of the pair in making a further determination whether the pair of users are the same user from the different social graphs;
searching, by the at least one computing device, the combined social graph network to determine if first and second users have a social connection in the combined social network graph; and
providing, by the at least one computing device, information associated with the second user to the first user if the first and second users have a social connection in the combined social network graph.

2. The method of claim 1, the information associated with the second user comprising content identified from preferences of the second user.

3. The method of claim 2, the content comprising one or more advertisements.

4. The method of claim 1, the information associated with the second user comprising user profile data of the second user.

5. The method of claim 1, further comprising:
receiving, by the at least one computing device, at least one item of information about the second user; and
the searching further comprising searching the combined social graph using the at least one item of information about the second user to determine if the first and second users have a social connection in the combined social graph; and
the providing information associated with the second user to the first user if the first and second users have a social connection in the combined social graph comprising providing at least one other item of information about the second user if the first and second users have a social connection.

6. The method of claim 5, the received at least one item of information about the second user comprising a name of the second user and the at least one other item of information comprising an email address of the second user.

7. The method of claim 1, the determination further comprising:

making, by the at least one computing device, a determination whether the pair of users are the same user from the different social graphs using the determined score and a level of confidence that the pair of users are the same user, the level of confidence being associated with the determined score.

8. The method of claim 7, the determination of the level of confidence for the determined score further comprising:
determining, by the at least one computing device, the level of confidence that is associated with an evidence condition, comprising:
estimating a probability of a match given the evidence condition, P(M|E), using a frequency of the evidence condition given a match, F(E|M), a frequency of the evidence condition, F(E), and an estimated probability of a match, P'(M).

9. The method of claim 8, the estimating further comprising:
estimating, by the at least one computing device, the probability of a match given the evidence condition as:

F(E|M)P'(M)/F(E).

10. The method of claim 8, the estimating further comprising:
determining the frequency of the evidence condition given a match, F(E|M), using a number of pairs of users in a confirmed set of matches having a match score satisfying a threshold score for the evidence condition.

11. The method of claim 8, the estimating further comprising:
determining, for each first user in a first social graph and a set of second users from a second social graph, a number of the second users in the set identified as a match for the first user using a matching algorithm, the set of second users being determined using a proximity search of the second social graph using user data of the first user and user data of the second users, the set of second users being determined to be closest matches to the first user relative to other second users in the second social graph; and
determining the frequency of the evidence condition, F(E), using a sum of the number of second users identified for each first user.

12. An electronic social networking system server comprising:
a processor and a non-transitory computer-readable storage medium for tangibly storing thereon program logic for execution by the processor, the stored program logic comprising:
analyzing logic executed by the processor for analyzing a plurality of different social graphs and generating a combined social graph from the plurality of different social graphs, each social graph of the plurality corresponding to a social network and each social graph and the combined social graph comprising a plurality of nodes and a plurality of edges each connecting a pair of nodes of the plurality of nodes, the analyzing comprising comparing user data to identify node matches across a number of the plurality of different social graphs and using social connections among users represented in the plurality of different social graphs to augment user data associated with a number of the nodes, the augmented user data being used in identifying node matches, comparison of user data of a pair of users from different social graphs of the plurality comprising:

comparing logic executed by the processor for comparing the user data associated with the pair of users to determine a score for the pair of users, the determined score representing a degree to which the user data associated with the pair of users match;
making logic executed by the processor for making an inconclusive initial determination that the pair of users are the same user using the determined score;
in response to the inconclusive initial determination using the determined score, the determination further comprising:
identifying logic executed by the processor for identifying a neighborhood of users for each user of the pair;
augmenting logic executed by the processor for augmenting the user data for a user of the pair using user data for at least one user in the user neighborhood identified for the user; and
using logic executed by the processor for using augmented user data for at least one of the users of the pair in making a further determination whether the pair of users are the same user from the different social graphs;
searching logic executed by the processor for searching the combined social graph to determine if first and second users have a social connection in the combined social graph; and
providing logic executed by the processor for providing information associated with the second user to the first user if the first and second users have a social connection in the combined social graph.

13. The electronic social networking system server of claim 12, the information associated with the second user comprising content identified from preferences of the second user.

14. The electronic social networking system server of claim 13, the content comprising one or more advertisements.

15. The electronic social networking system server of claim 12, the information associated with the second user comprising user profile data of the second user.

16. The electronic social networking system server of claim 12, the program logic further comprising:
receiving logic executed by the processor for receiving at least one item of information about the second user; and
the searching logic further comprising searching logic executed by the processor for searching the combined social graph using the at least one item of information about the second user to determine if the first and second users have a social connection in the combined social graph; and
the providing logic executed by the processor for providing information associated with the second user to the first user if the first and second users have a social connection in the combined social graph comprising providing logic executed by the processor for providing at least one other item of information about the second user if the first and second users have a social connection.

17. The electronic social networking system server of claim 16, the received at least one item of information about the second user comprising a name of the second user and the at least one other item of information comprising an email address of the second user.

18. The electronic social networking system server of claim 12, the determination further comprising:
making logic executed by the processor for making a determination whether the pair of users are the same user from the different social graphs using the determined score and a level of confidence that the pair of users are the same user, the level of confidence being associated with the determined score.

19. The electronic social networking system server of claim 18, the determination of the level of confidence for the determined score further comprising:
determining logic executed by the processor for determining the level of confidence that is associated with an evidence condition, comprising:
estimating logic executed by the processor for estimating a probability of a match given an evidence condition, P(M|E), using a frequency of the evidence condition given a match, F(E|M), a frequency of the evidence condition, F(E), and an estimated probability of a match, P'(M).

20. The electronic social networking system server of claim 19, the estimation of the probability of a match further comprising:
estimating logic executed by the processor for estimating the probability of a match given the evidence condition as:

F(E|M)P'(M)/F(E).

21. The electronic social networking system server of claim 19, the estimation of the probability of a match further comprising:
determining logic executed by the processor for determining the frequency of the evidence condition given a match, F(E|M), using a number of pairs of users in a confirmed set of matches having a match score satisfying a threshold score for the evidence condition.

22. The electronic social networking system server of claim 19, the estimation of the probability of a match further comprising:
determining logic executed by the processor for determining, for each first user in a first social graph and a set of second users from a second social graph, a number of the second users in the set identified as a match for the first user using a matching algorithm, the set of second users being determined using a proximity search of the second social graph using user data of the first user and user data of the second users, the set of second users being determined to be closest matches to the first user relative to other second users in the second social graph; and
determining logic executed by the processor for determining the frequency of the evidence condition, F(E), using a sum of the number of second users identified for each first user.

23. A computer readable non-transitory storage medium, having stored thereon, processor-executable instructions, that when executed by an electronic social networking system server, perform a method comprising:
analyzing a plurality of different social graphs and generating a combined social graph from the plurality of different social graphs, each social graph of the plurality corresponding to a social network and each social graph and the combined social graph comprising a plurality of nodes and a plurality of edges each connecting a pair of nodes of the plurality of nodes, the analyzing comprising comparing user data to identify node matches across a number of the plurality of different social graphs and using social connections among users represented in the plurality of different social graphs to augment user data associated with a number of the nodes, the augmented user data being used in identifying node matches, comparison of user data of a pair of users from different social graphs of the plurality comprising:
comparing the user data associated with the pair of users to determine a score for the pair of users, the determined score representing a degree to which the user data associated with the pair of users match;
making an inconclusive initial determination that the pair of users are the same user using the determined score;
in response to the inconclusive initial determination using the determined score, the determination further comprising:
identifying a user neighborhood comprising a number of users for each user of the pair;
augmenting the user data for a user of the pair using user data for at least one user in the user neighborhood identified for the user; and
using augmented user data for at least one of the users of the pair in making a further determination whether the pair of users are the same user from the different social graphs;
searching the combined social graph network to determine if first and second users have a social connection in the combined social graph; and
providing information associated with the second user to the first user if the first and second users have a social connection in the combined social graph.

24. The medium of claim 23, the information associated with the second user comprising content identified from preferences of the second user.

25. The medium of claim 24, the content comprising one or more advertisements.

26. The medium of claim 23, the information associated with the second user comprising user profile data of the second user.

27. The medium of claim 23, further comprising:
receiving at least one item of information about the second user; and
the searching further comprising searching the combined social graph using the at least one item of information about the second user to determine if the first and second users have a social connection in the combined social graph; and
the providing information associated with the second user to the first user if the first and second users have a social connection in the combined social graph comprising providing at least one other item of information about the second user if the first and second users have a social connection.

28. The medium of claim 27, the received at least one item of information about the second user comprising a name of the second user and the at least one other item of information comprising an email address of the second user.

29. The medium of claim 23, the determination further comprising:
making a determination whether the pair of users are the same user from the different social graphs using the determined score and a level of confidence that the pair of users are the same user, the level of confidence being associated with the determined score.

30. The medium of claim 29, the determination of the level of confidence for the determined score further comprising:
  determining the level of confidence that is associated with an evidence condition, comprising:
    estimating a probability of a match given the evidence condition, P(M|E), using a frequency of the evidence condition given a match, F(E|M), a frequency of the evidence condition, F(E), and an estimated probability of a match, P'(M).

31. The medium of claim 30, the instructions to estimate further comprising instructions to:
  estimate the probability of a match given the evidence condition as:
    F(E|M)P'(M)/F(E).

32. The medium of claim 30, the instructions to estimate further comprising instructions to:
  determine the frequency of the evidence condition given a match, F(E|M), using a number of pairs in a confirmed set of matches having a match score satisfying a threshold score for the evidence condition.

33. The medium of claim 30, the instructions to estimate further comprising instructions to:
  determine, for each first user in a first social graph and a set of second users from a second social graph, a number of the second users in the set identified as a match for the first user using a matching algorithm, the set of second users being determined using a proximity search of the second social graph using user data of the first user and user data of the second users, the set of second users being determined to be closest matches to the first user relative to other second users in the second social graph; and
  determine the frequency of the evidence condition, F(E), using a sum of the number of second users identified for each first user.

\* \* \* \* \*